US009581704B2

(12) United States Patent
Fullerton et al.

(10) Patent No.: US 9,581,704 B2
(45) Date of Patent: Feb. 28, 2017

(54) SYSTEM AND METHOD FOR ACCELERATING A MASS USING A PRESSURE PRODUCED BY A DETONATION

(71) Applicant: Soundblast Technologies, LLC, Winter Park, FL (US)

(72) Inventors: Larry W Fullerton, New Hope, AL (US); James L Teel, Winter Park, FL (US); Herman M Thompson, Jr., Kelso, TN (US)

(73) Assignee: SoundBlast Technologies, LLC, WinterPark, FL (US)

( * ) Notice: Subject to any disclaimer, the term of this patent is extended or adjusted under 35 U.S.C. 154(b) by 0 days.

(21) Appl. No.: 15/003,525

(22) Filed: Jan. 21, 2016

(65) Prior Publication Data

US 2016/0216387 A1    Jul. 28, 2016

Related U.S. Application Data

(60) Provisional application No. 62/106,647, filed on Jan. 22, 2015, provisional application No. 62/247,634,
(Continued)

(51) Int. Cl.
*G01V 1/13* (2006.01)
*G01V 1/104* (2006.01)
*F42B 3/04* (2006.01)

(52) U.S. Cl.
CPC .............. *G01V 1/104* (2013.01); *F42B 3/04* (2013.01)

(58) Field of Classification Search
CPC ...................................................... G01V 1/13
(Continued)

(56) References Cited

U.S. PATENT DOCUMENTS

| 2,994,397 A | 8/1961 | Huckabay et al. |
| 3,048,816 A | 8/1962 | Lubnow |

(Continued)

FOREIGN PATENT DOCUMENTS

| GB | 934 749 | 8/1963 |
| GB | 1 269 123 | 4/1972 |

(Continued)

OTHER PUBLICATIONS

International Search Report dated Apr. 24, 2008 Issued in International Application No. PCT/US2007/09441.
(Continued)

*Primary Examiner* — Forrest M Phillips
(74) *Attorney, Agent, or Firm* — Vector IP Law Group; Robert S. Babayi

(57) ABSTRACT

The present invention pertains to a system and method for accelerating a mass using a pressure produced by a detonation, where the mass is accelerated over a movement range using a detonation of a pressure wave generator that produces a pressure within a coupling component that is applied to a piston having a surface area that produces a resultant force, where the acceleration of the mass determines the resulting force. The resulting force may be directed vertically and perpendicular to a target media to conduct an acoustic wave into the target media. The system may be configured to direct the resulting force horizontally and parallel to a target media to conduct a plane shear wave into the target media. Two systems may be configured to direct two resulting forces horizontally and parallel to a target media to conduct a spherical shear wave into a target media, where the two resulting forces are directed in opposite directions and separated by some distance.

20 Claims, 30 Drawing Sheets

Related U.S. Application Data filed on Oct. 28, 2015, provisional application No. 62/269,549, filed on Dec. 18, 2015.

(58) Field of Classification Search
USPC .................................................. 181/116, 119
See application file for complete search history.

(56) References Cited

U.S. PATENT DOCUMENTS

| | | | |
|---|---|---|---|
| 3,064,753 A | 11/1962 | Mcclure | |
| 3,099,813 A | 7/1963 | Anderson | |
| 3,233,694 A | 2/1966 | Roever | |
| 3,235,026 A | 2/1966 | Hottman | |
| 3,410,142 A | 11/1968 | Diaber et al. | |
| 3,412,394 A | 11/1968 | Lewis et al. | |
| 3,828,886 A | 8/1974 | Holloway | |
| 3,897,195 A | 7/1975 | Finch | |
| 3,997,021 A * | 12/1976 | Chelminski | G01V 1/137 175/1 |
| 3,997,022 A * | 12/1976 | Cholet | G01V 1/135 181/119 |
| 4,043,420 A | 8/1977 | Zens et al. | |
| 4,356,753 A | 11/1982 | Galley | |
| 4,642,611 A * | 2/1987 | Koerner | G10K 15/04 116/22 A |
| 4,662,844 A | 5/1987 | Gallagher et al. | |
| 4,664,631 A | 5/1987 | Pederson et al. | |
| 4,712,641 A * | 12/1987 | Chelminski | G01V 1/047 181/113 |
| 4,741,154 A | 5/1988 | Eidelman | |
| 5,345,758 A | 9/1994 | Bussing | |
| 5,430,691 A | 7/1995 | Fridman | |
| 5,473,885 A | 12/1995 | Hunter, Jr. et al. | |
| 5,513,489 A | 5/1996 | Bussing | |
| 5,579,633 A | 12/1996 | Hunter, Jr. et al. | |
| 5,644,314 A | 7/1997 | Ahmad et al. | |
| 5,800,153 A * | 9/1998 | DeRoche | F23C 15/00 431/1 |
| 5,855,827 A | 1/1999 | Bussing et al. | |
| 5,864,517 A | 1/1999 | Hinkey et al. | |
| 5,873,240 A | 2/1999 | Bussing et al. | |
| 5,937,635 A | 8/1999 | Winfree et al. | |
| 5,973,999 A | 10/1999 | Naff et al. | |
| 6,003,301 A | 12/1999 | Bratkovich et al. | |
| 6,062,018 A | 5/2000 | Bussing | |
| 6,360,173 B1 | 3/2002 | Fullerton | |
| 6,408,614 B1 | 6/2002 | Eizenhofer | |
| 6,478,107 B1 * | 11/2002 | Birchak | G01V 1/133 181/104 |
| 6,705,425 B2 * | 3/2004 | West | E21B 43/003 181/102 |
| 6,813,878 B2 | 11/2004 | Kraft | |
| 6,928,804 B2 | 8/2005 | Venkataramani et al. | |
| 7,007,455 B2 | 3/2006 | Kraft | |
| 7,093,794 B2 | 8/2006 | Leyva et al. | |
| 7,100,377 B2 | 9/2006 | Kraft | |
| 7,377,357 B2 * | 5/2008 | Duren | G01V 1/04 181/108 |
| 7,797,110 B2 | 9/2010 | Shin | |
| 7,841,982 B2 | 11/2010 | Johnson et al. | |
| 7,882,926 B2 | 2/2011 | Fullerton | |
| 7,886,866 B2 | 2/2011 | Fullerton | |
| 7,944,774 B2 | 5/2011 | Monk et al. | |
| 8,292,022 B2 | 10/2012 | Fullerton | |
| 2005/0103022 A1 | 5/2005 | Kraft | |
| 2005/0125933 A1 | 6/2005 | Hochstein, Jr. et al. | |
| 2007/0199382 A1 | 8/2007 | Sakai | |

FOREIGN PATENT DOCUMENTS

| | | |
|---|---|---|
| JP | 59 56023 | 4/1984 |
| RU | 2 084 675 C1 | 7/1997 |
| RU | 2 130 597 C1 | 5/1999 |
| RU | 2 188 084 C2 | 8/2002 |
| RU | 36135 | 2/2004 |
| SU | 1716253 A1 | 2/1992 |
| WO | 94 22559 | 10/1994 |
| WO | 99 09355 A1 | 2/1999 |

OTHER PUBLICATIONS

Written Opinion of the International Searching Authority dated Apr. 24, 2008, Issued in in International Application No. PCT/US2007/09441.

Nicholls, J.A. et al., "Intermittent detonation as a thrust-producing mechanism," Engineering Research Institute, University of Michigan, Jan. 1954.

Van Wingerden, K. et al., "Detonations in pipes and in the open," Christian Michelsen Research, Bergen, Norway, Nov. 1999.

Kelly, J., "After Combustion: Detonation," Popular Science, Sep. 2003.

Lu, F.K. et al., "Experimental study of a pulse detonation rocket with Shchelkin spiral," Aerodynamics Research Center, University of Texas at Arlington, TX 76019, USA, pp. 1-6.

International Search Report dated Sep. 10, 2008 issued in PCT/US07/09442.

Written Opinion of the International Searching Authority dated Sep. 10, 2008 issued in PCT/US07/09442.

Office Action dated Mar. 29, 2010, issued in related U.S. Appl. No. 11/785,320.

International Search Report dated Sep. 10, 2008, issued in related International Appln. No. PCT/US07/09444.

Written Opinion of the International Searching Authority dated Sep. 10, 2008, issued in related International Appln. No. PCT/US07/09444.

Office Action dated Aug. 4, 2011, issued in related U.S. Appl. No. 13/015,876.

* cited by examiner

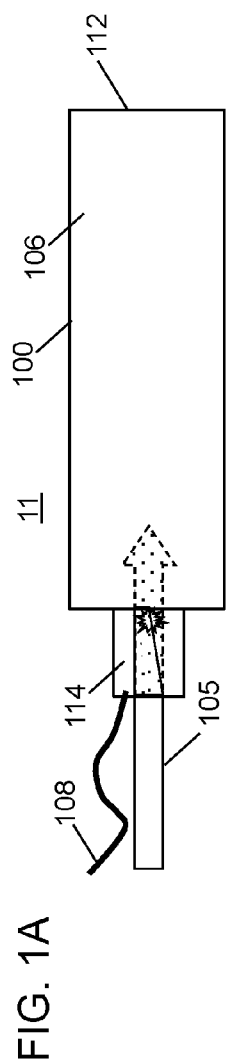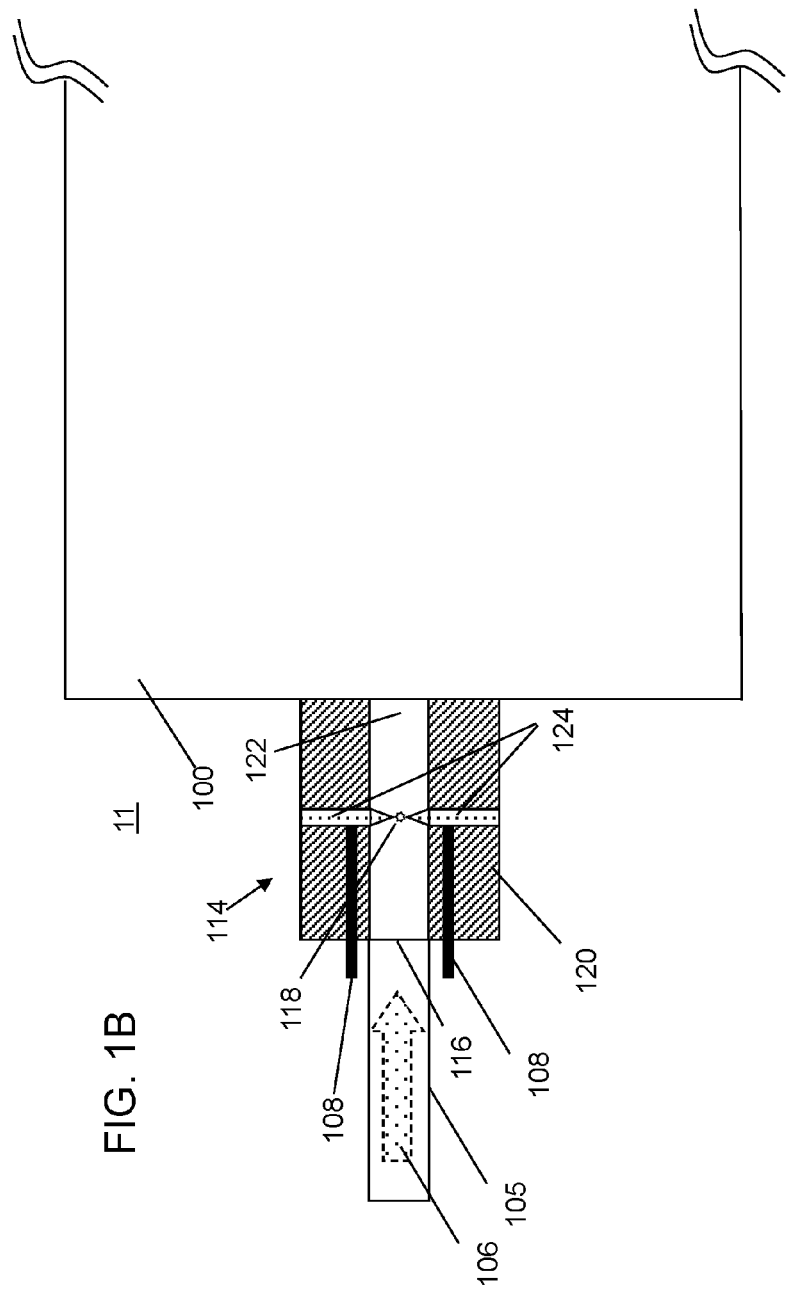

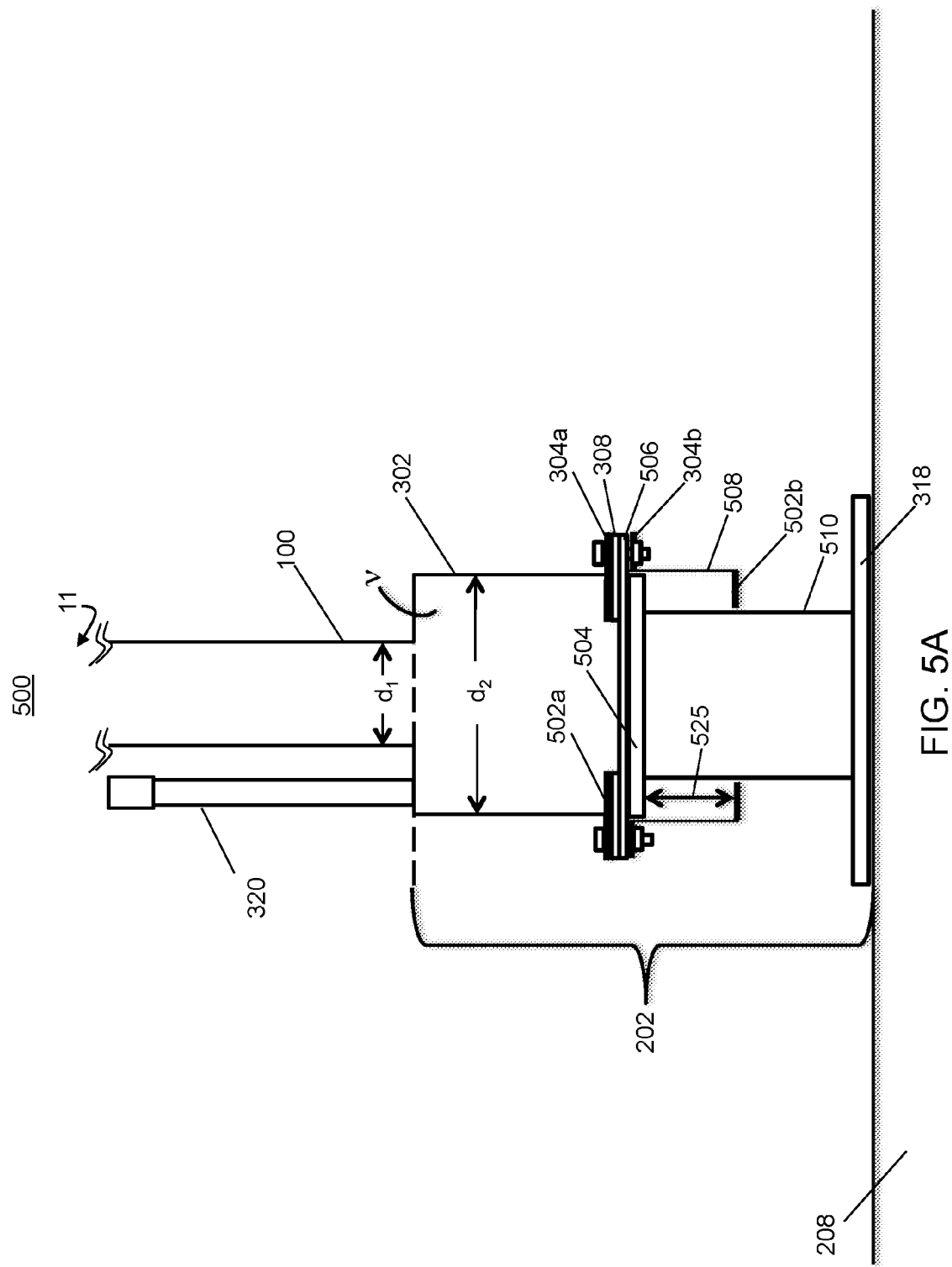

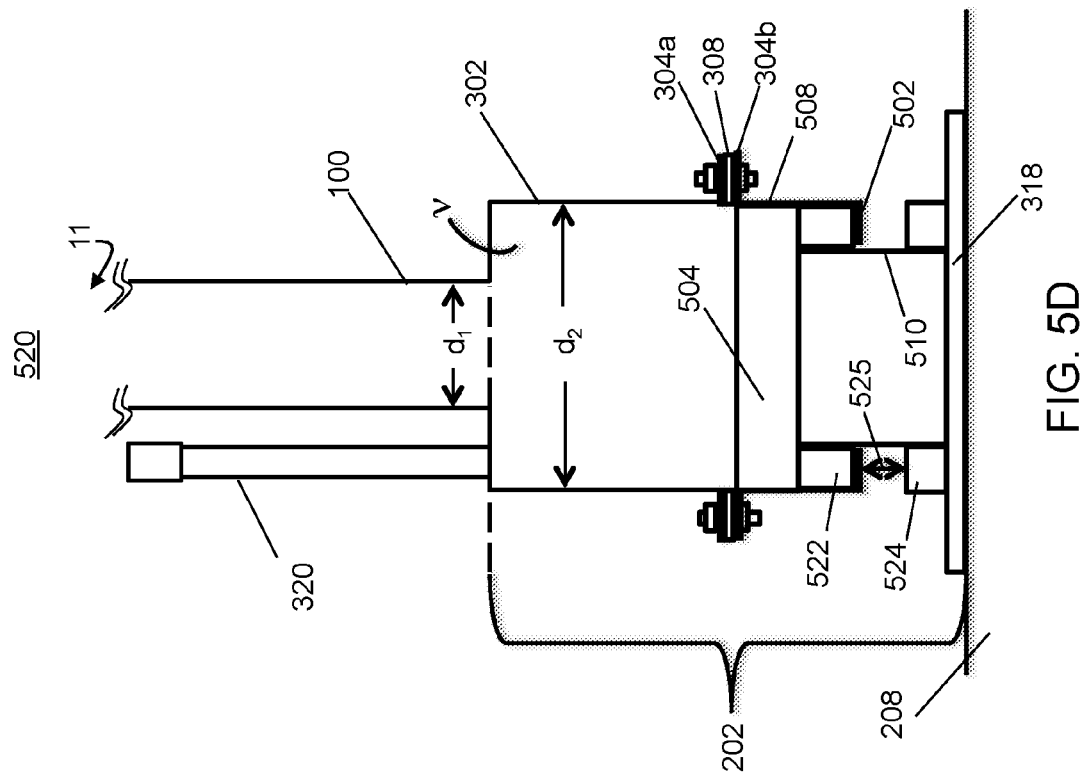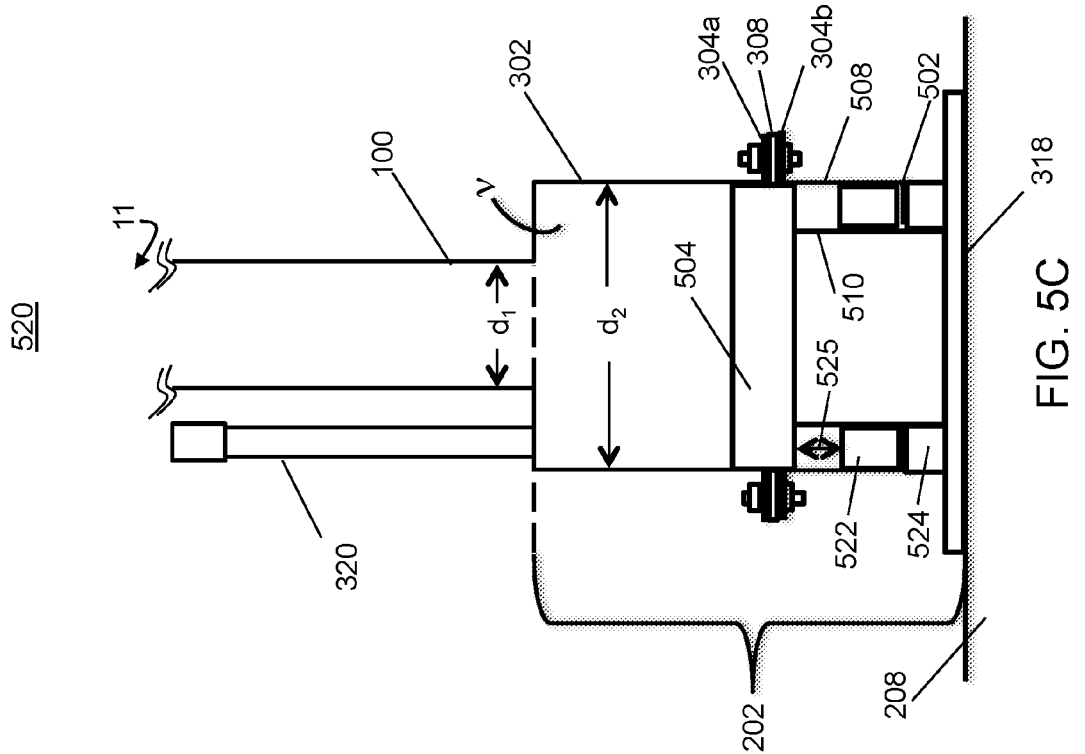

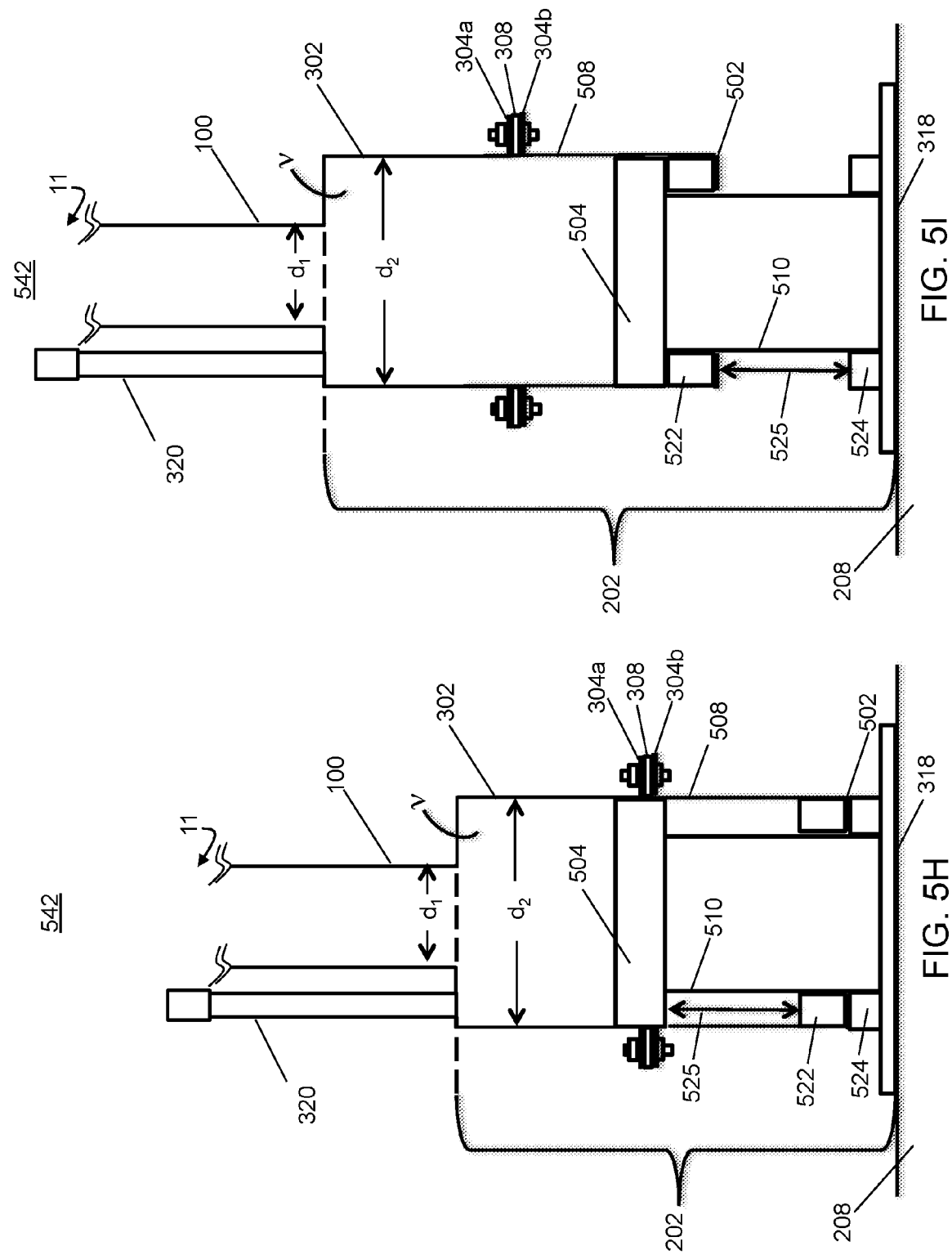

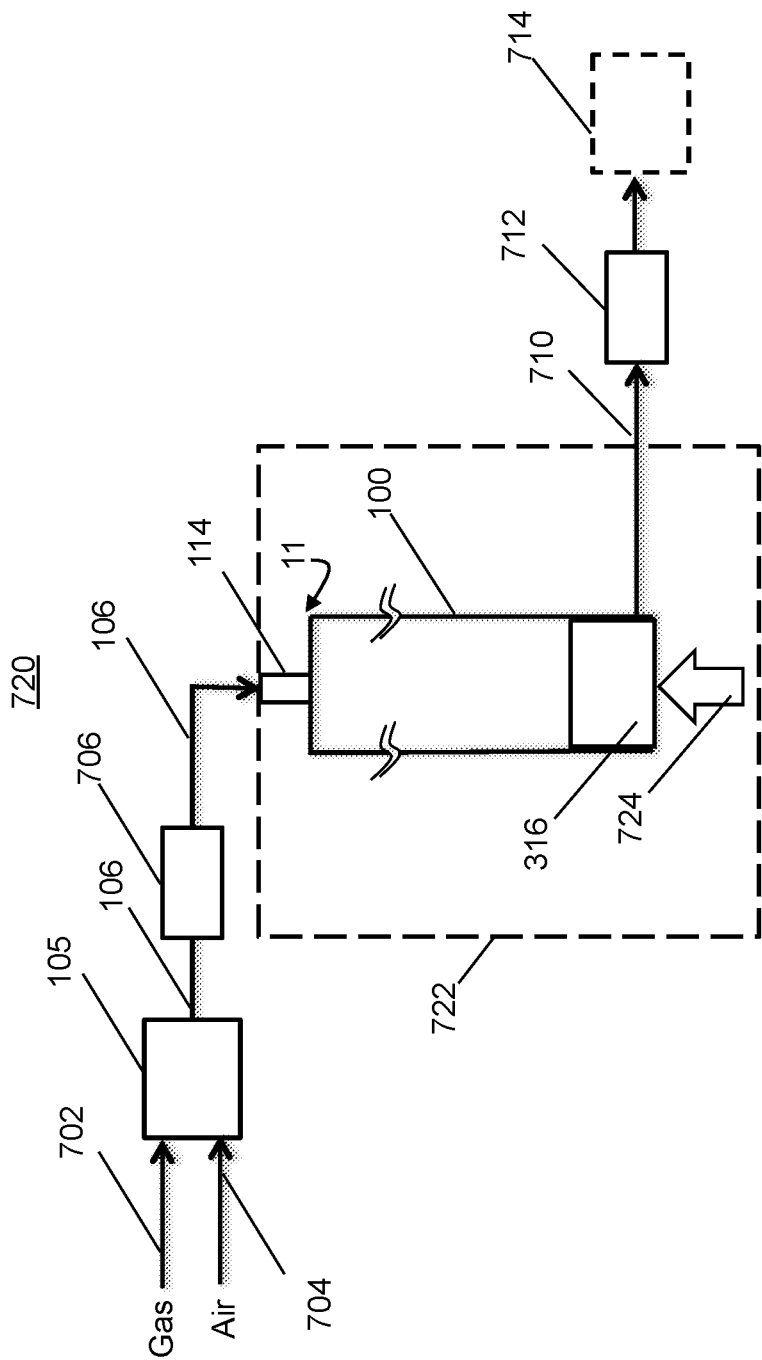

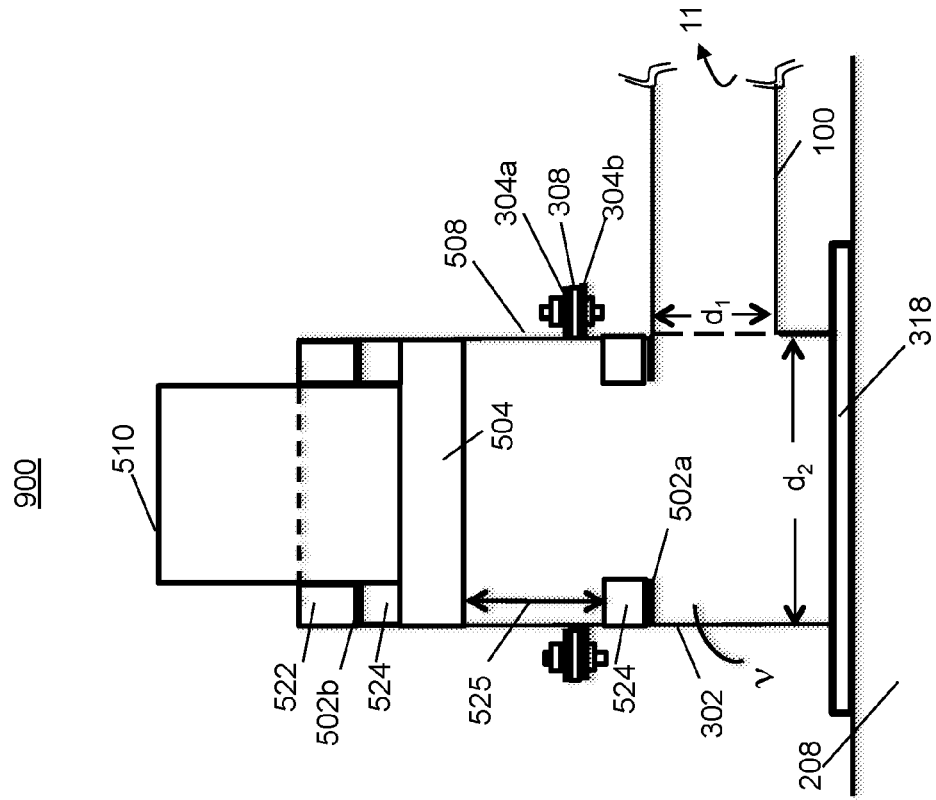
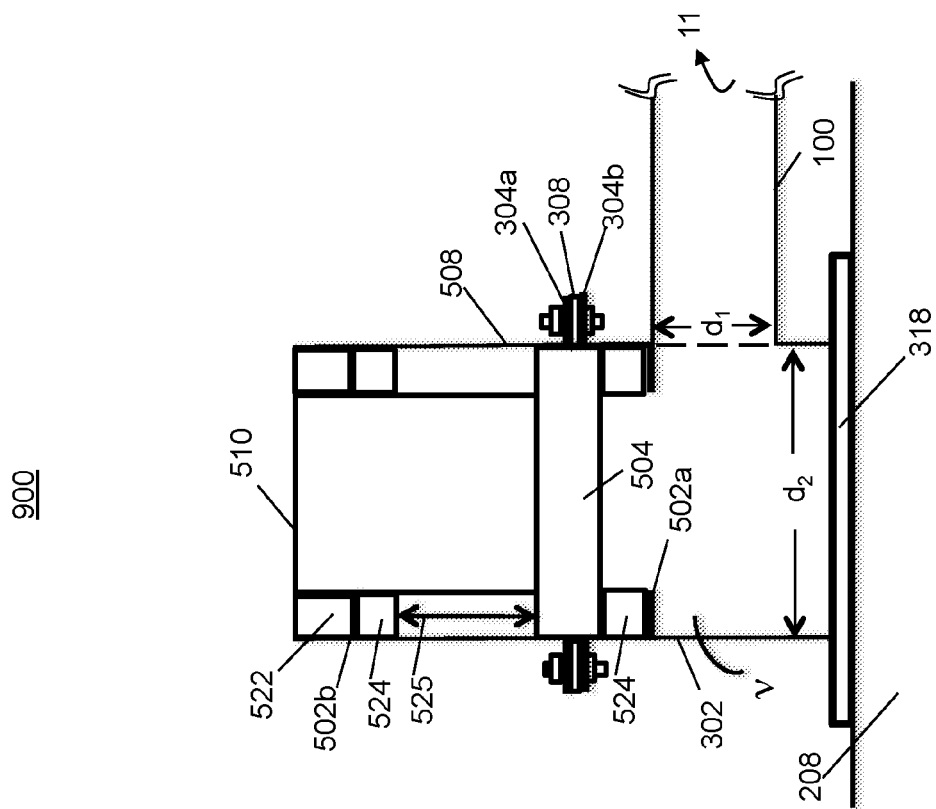

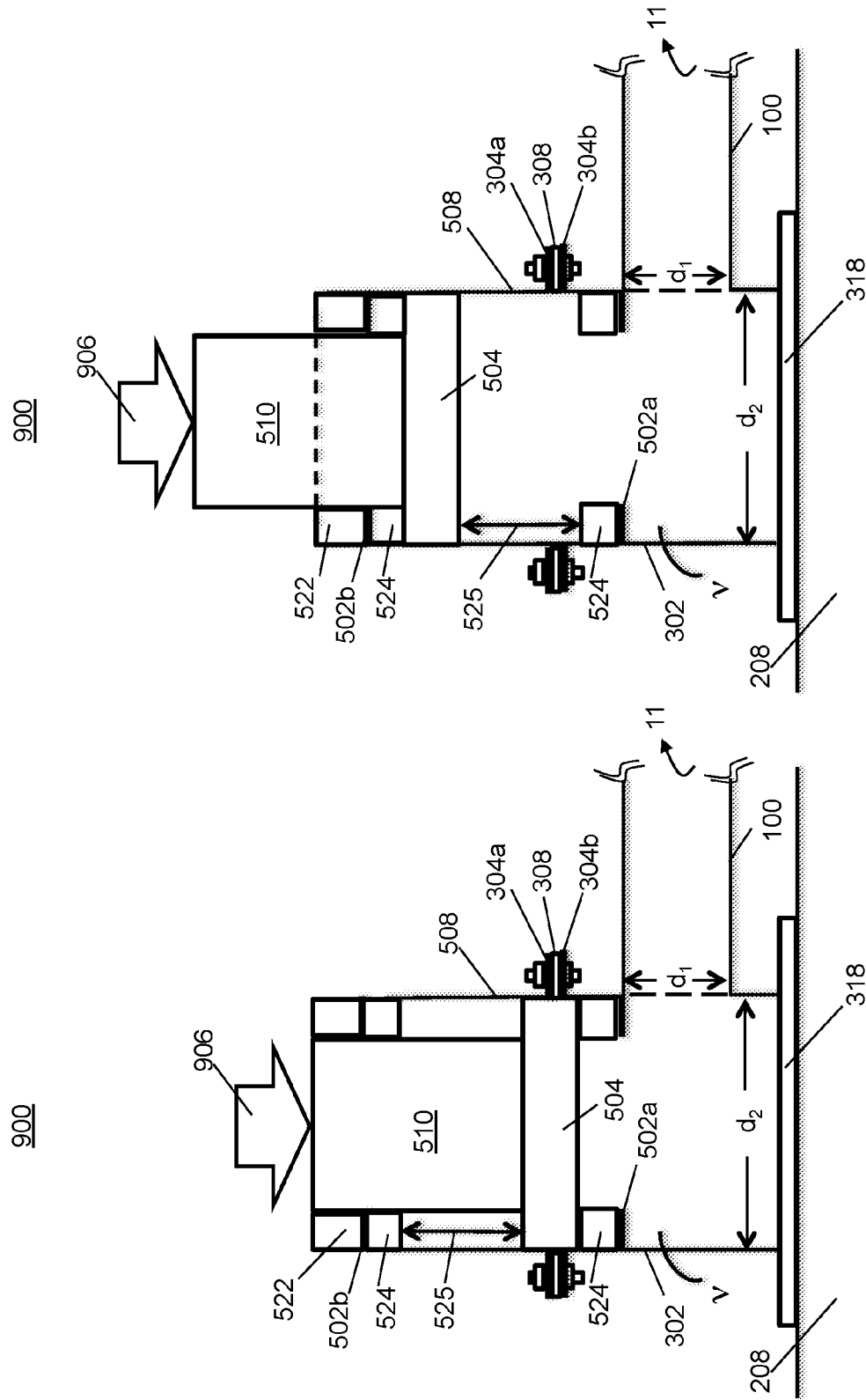

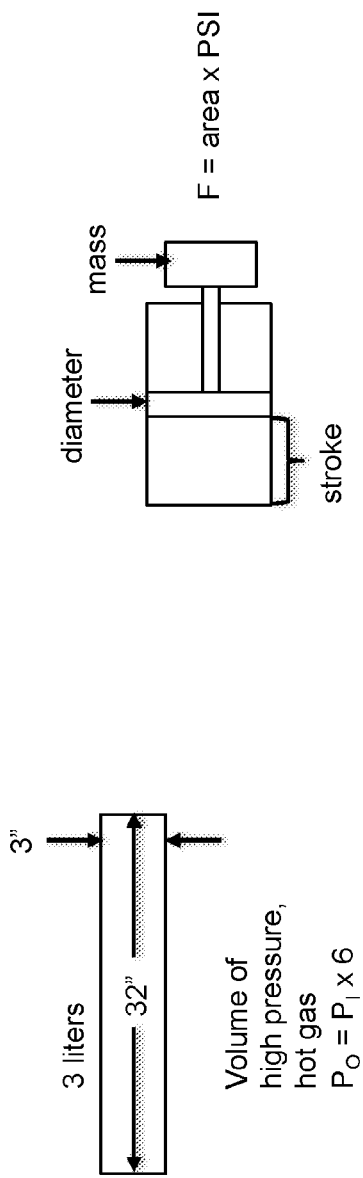
FIG. 13A
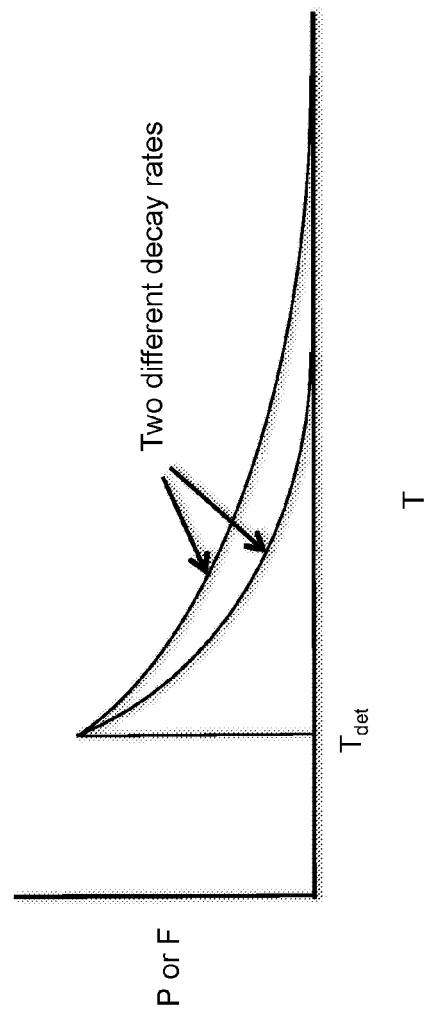
FIG. 13B
FIG. 13C

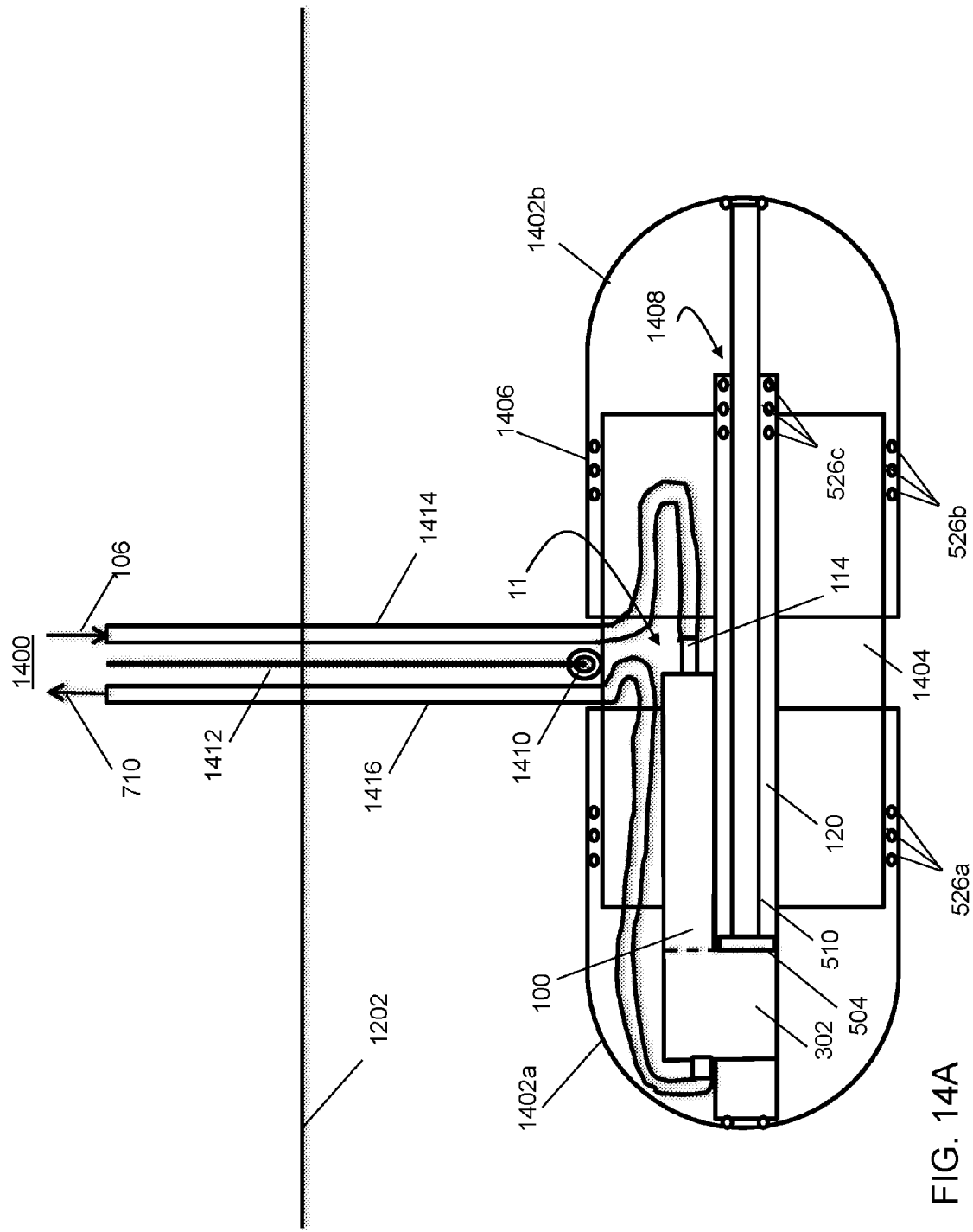

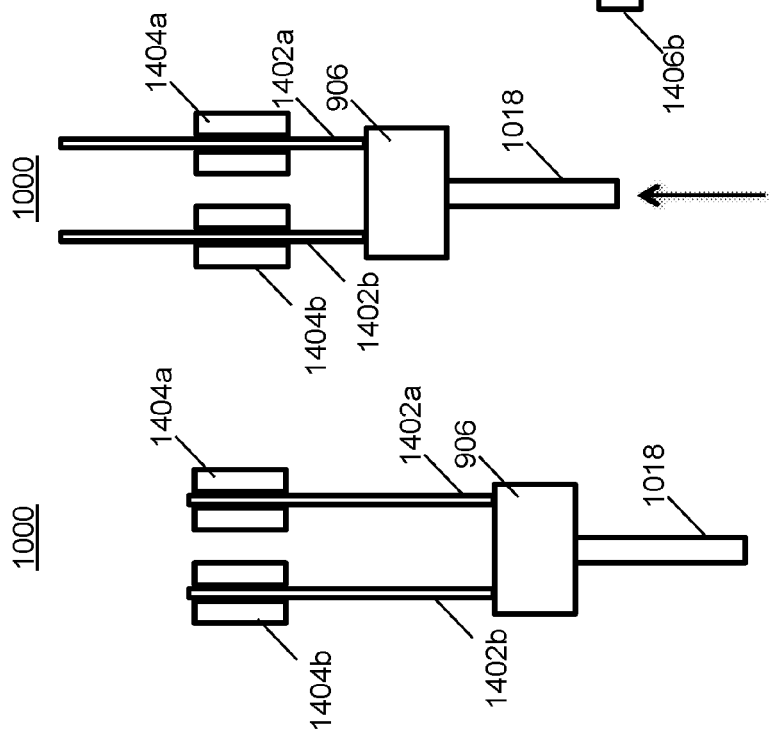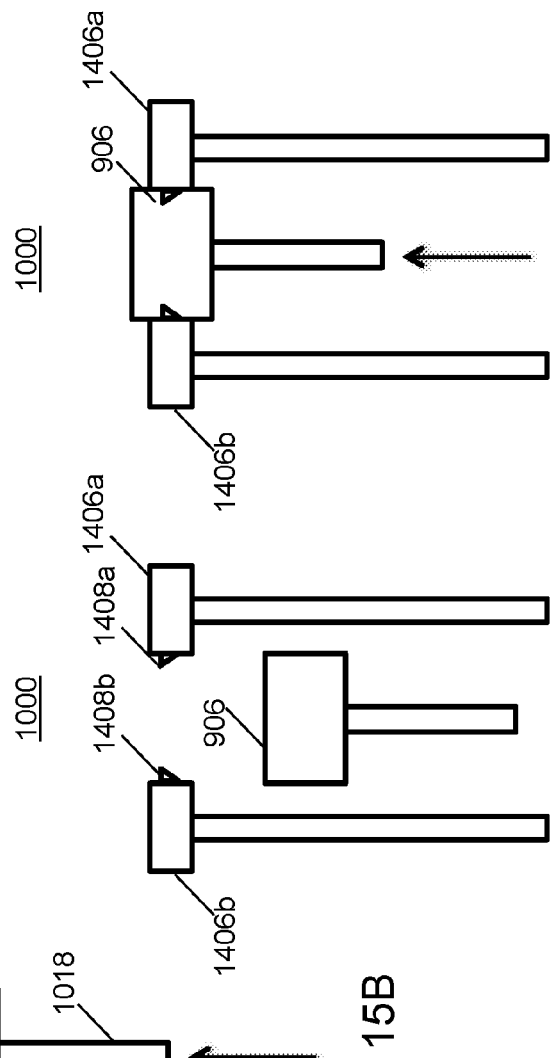

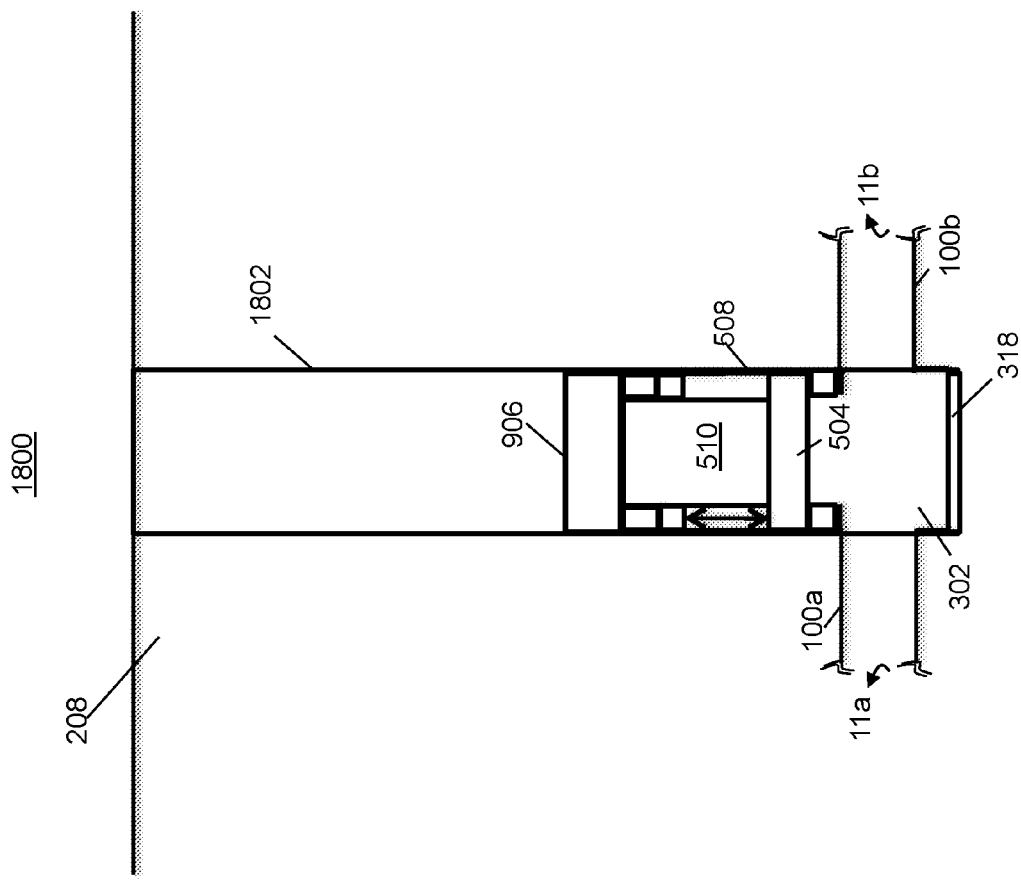

SYSTEM AND METHOD FOR ACCELERATING A MASS USING A PRESSURE PRODUCED BY A DETONATION

CROSS REFERENCE TO RELATED PATENTS AND PATENT APPLICATIONS

This U.S. Non-Provisional Application claims the benefit of U.S. Provisional Application No. 62/106,647, filed Jan. 22, 2015, U.S. Provisional Application No. 62/247,634, filed Oct. 28, 2015, and U.S. Provisional Application No. 62/269,549, filed Dec. 18, 2015.

These patent applications are all incorporated herein by reference in their entirety.

FIELD OF THE INVENTION

The present invention relates generally to a system and method for harnessing pressure produced by a detonation. More particularly, the present invention relates to a system and method for harnessing pressure produced by a detonation within an overpressure wave generator configured to couple an overpressure wave to a target media.

SUMMARY OF THE INVENTION

One embodiment of the invention involves a system for accelerating a mass comprising a coupling component comprising a coupling chamber and a moveable component, and an overpressure wave generator configured to produce a detonation that produces a pressure within the coupling chamber, the pressure being applied to the moveable component to accelerate a mass to produce a resultant force, the coupling chamber being substantially sealed when the detonation is produced, the mass being provided to the system prior to the detonation, the system bearing the full weight of the mass during the detonation, the mass being removable from the system enabling the mass and the system to be moved separately from a first location to a second location.

The resultant force can be directed vertically and perpendicular to a target media to conduct an acoustic wave into the target media.

The resultant force can be directed horizontally and parallel to a target media to conduct a plane shear wave into the target media.

Two systems can be configured to direct corresponding two resulting forces horizontally and parallel to a target media to conduct a spherical shear wave into the target media.

The two resulting forces can be directed in opposite directions to each other and be separated by some distance.

The moveable component can be one of a piston or a plate.

The mass can be configured to have an upward vertical movement when the detonation is produced.

The mass may comprises a plurality of weights.

The plurality of weights can be a plurality of metal plates.

The mass can be configured to have a downward vertical movement when the detonation is produced.

The system may include a hydraulics transformer subsystem configured to lift the mass.

The system may include a leveling device.

The system can be configured to absorb a shock produced when a lifted mass returns to its position prior to the detonation being produced.

The system may include a vessel configured to be filled with a fluid, the fluid being the mass.

A shock produced by the mass returning to its non-lifted position can be used to produce a conducted acoustic wave in a target media.

The system can be configured to pull a vacuum in the coupling chamber.

The system can be contained within a casing installed in a target media.

The overpressure wave generator can be a direct detonation overpressure wave generator.

A second embodiment of the invention involves a method for accelerating a mass using a pressure produced by a detonation, comprising providing a mass acceleration system comprising a coupling component comprising a coupling chamber and a moveable component, and an overpressure wave generator configured to produce a detonation; providing a mass; and producing using the overpressure wave generator the detonation to produce a pressure within the coupling chamber, the pressure being applied to the moveable component to accelerate the mass to produce a resultant force, the coupling chamber being substantially sealed when the detonation is produced, the mass being provided to the system prior to the detonation, the system bearing the full weight of the mass during the detonation, the mass being removable from the system enabling the mass and the system to be moved separately from a first location to a second location.

The overpressure wave generator can be a direct detonation overpressure wave generator.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 1A and 1B depict an exemplary overpressure wave generator;

FIG. 5A depicts an exemplary coupling component that includes a coupling chamber, a flexible membrane, and a push plate assembly comprising a top plate, a piston rod, a movement constraining vessel, and an earth plate;

FIG. 5C depicts the exemplary coupling component of FIG. 5B prior to detonation;

FIG. 5D depicts the exemplary coupling component of FIG. 5B immediately after detonation;

FIG. 5H depicts an exemplary coupling component prior to detonation that is the same as the exemplary coupling component of FIG. 5F except the piston rod and movement constraining vessel have both been lengthened;

FIG. 5I depicts an exemplary coupling component of FIG. 5H immediately after detonation;

FIG. 7B depicts an exemplary detonation wave pressure harnessing system;

FIG. 9A depicts an exemplary system having a coupling component prior to detonation that is similar to the exemplary coupling component of FIG. 8A except the coupling component is beneath a piston and piston rod;

FIG. 9B depict the exemplary system of FIG. 9A immediately after detonation;

FIGS. 9D and 9E depict the exemplary system of FIGS. 9A and 9B except an external mass 906 provides a downward force on the piston rod 510;

FIG. 13A depicts an exemplary calculation of an output pressure produced by a high pressure hot gas having a volume corresponding to the vessel in which the pressure is contained;

FIG. 13B depicts an exemplary piston inside a coupling chamber where the piston is attached to a mass;

FIG. 13C depict exemplary Pressure (or Force) vs. Time curves showing two decay rates;

FIGS. 14A and 14B depict another exemplary seismic exploration system that includes a first outer capsule portion and a second outer capsule portion and an inner capsule portion;

FIGS. 15A and 15B depict an optional vertical braking system;

FIGS. 16A and 16B depict an optional latching system;

FIG. 18 depicts an exemplary casing.

DETAILED DESCRIPTION OF THE INVENTION

Figure 2:
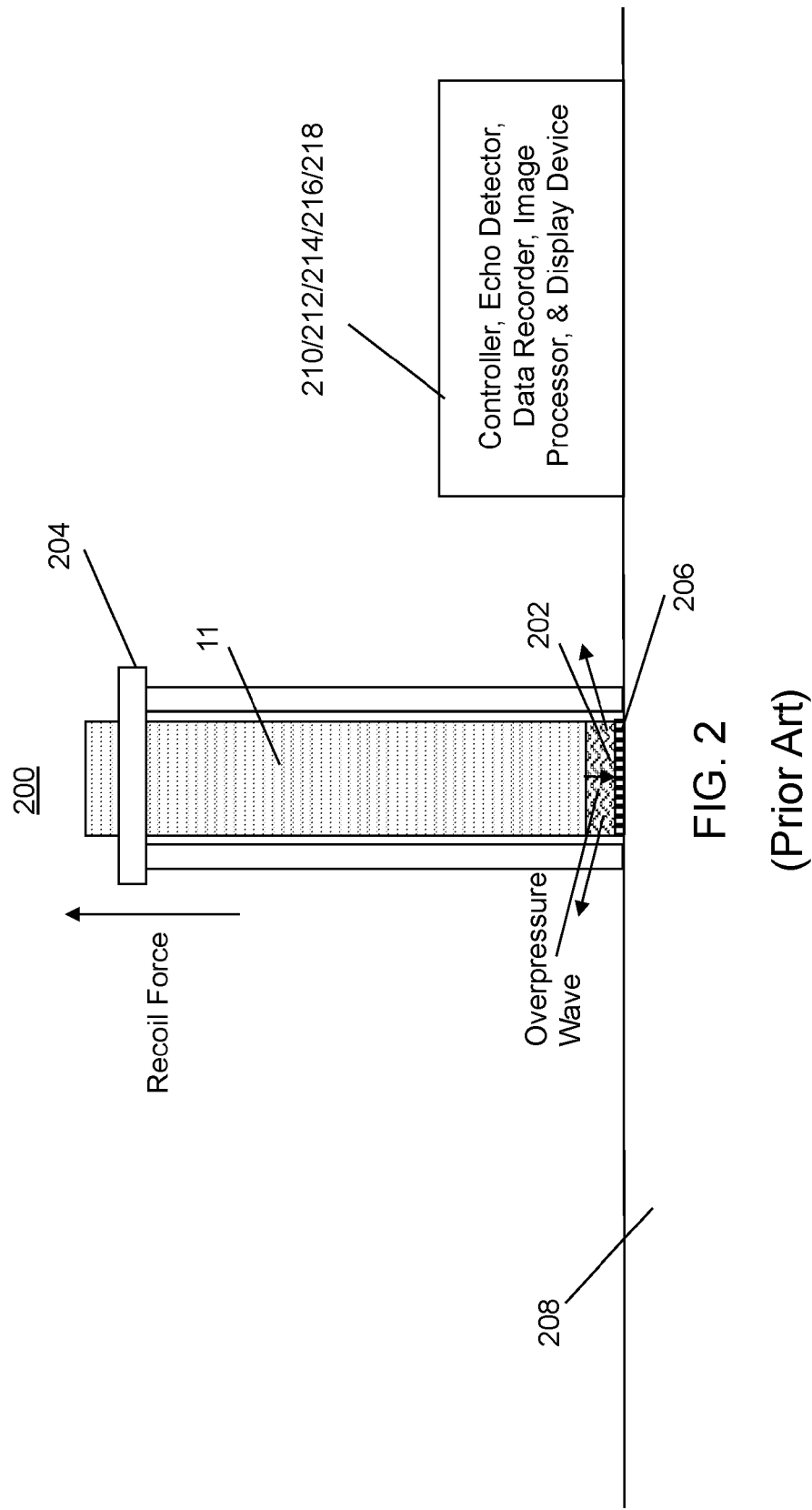
FIG. 2 depicts an exemplary seismic exploration system.

The present invention will now be described more fully in detail with reference to the accompanying drawings, in which the preferred embodiments of the invention are shown. Certain drawings may have components enlarged for illustrative purposes. This invention should not, however, be construed as limited to the embodiments set forth herein; rather, they are provided so that this disclosure will be thorough and complete and will fully convey the scope of the invention to those skilled in the art.

Certain described embodiments may relate, by way of example but not limitation, to systems and/or apparatuses comprising overpressure wave generators, methods for using overpressure wave generators, and so forth. Example realizations for such embodiments may be facilitated, at least in part, by the use of an emerging, revolutionary overpressure wave generation technology that may be termed direct detonation overpressure wave generation that enables precision timing and amplitude control of detonations and corresponding generated overpressure waves. Alternatively, the technology may be termed instantaneous detonation or any other such terminology indicative that detonation is achieved without deflagration, or in other words, without a deflagration to detonation transition (DDT) process. Direct detonation technology was first fully described and enabled in the co-assigned U.S. Pat. No. 7,883,926 issued on Feb. 8, 2011 and entitled "System and Method for Generating and Directing Very Loud Sounds", the co-assigned U.S. Pat. No. 7,886,866 issued on Feb. 15, 2011 and entitled "System and Method for Ignition of a Gaseous or Dispersed Fuel-oxidant Mixture", and the co-assigned U.S. Pat. No. 8,292,022, issued on Oct. 23, 2012 and entitled "System and Method for Generating and Controlling Conducted Acoustic Wave for Geophysical Exploration". The contents of these documents are hereby incorporated herein by reference. A second generation of a direct detonation overpressure wave technology is described and enabled in the co-assigned U.S. Pat. No. 8,302,730, issued on Nov. 6, 2012, and entitled "System and Method for Generating and Controlling Conducted Acoustic Wave for Geophysical Exploration". The contents of this document are hereby incorporated herein by reference.

The present invention pertains to a system and method for accelerating a mass, or reaction mass, using a pressure produced by a detonation, where a mass is accelerated over a movement range using a detonation of a pressure wave generator that produces a pressure within a coupling component that is applied to a piston having a surface area that produces a resultant force F, where an acceleration of the mass determines the resulting force F (i.e., F=ma). The resulting force may be directed vertically and perpendicular to a target media to conduct an acoustic wave into the target media. Alternatively, a system may be configured to direct the resulting force horizontally and parallel to a target media to conduct a plane shear wave into the target media, or two systems may be configured to direct corresponding two resulting forces horizontally and parallel to a target media to conduct a spherical shear wave into a target media, where the two resulting forces are directed in opposite directions to each other and separated by some distance.

Direct Detonation Overpressure Wave Generator Background

FIGS. 1A and 1B depict an exemplary direct detonation overpressure wave generator. FIG. 1A depicts a detonation tube 100 of an overpressure wave generator 11 being supplied by fuel-oxidant mixture supply 105 via a detonator 114, where a spark ignites within the fuel-oxidant mixture 106 while the detonation tube 100 is being filed with the fuel-oxidant mixture 106 instantly causing detonation at the point of ignition that causes a detonation wave to propagate down the length of the detonation tube 100 and exit its open end 112.

As shown in 1B, the detonator 114 comprises an electrically insulating cylinder 120 surrounding a detonator tube 122. Electrodes 124 are inserted from the sides of insulating cylinder 120 and are connected to high voltage wire 108. The detonator tube 122 is connected to fuel-oxidant mixture supply 105 (shown in FIG. 3B) at a fill point 116 and to a detonation tube 100 at its opposite end. As shown in FIG. 1B, a gas mixture 106 is passed into the detonator tube 122 and then into the detonation tube 100 via a fill point 116 of the detonator 114. When the detonation tube 100 is essentially full, high voltage wire 108 is triggered to cause a spark 118 to occur across electrodes 124 and to pass through the gas mixture 106 flowing into detonator tube 122 to initiate detonation of the gas in the detonation tube 100.

FIG. 2 depicts an exemplary seismic exploration system 200 that includes an overpressure wave generator 11, a coupling component 202, a stabilizing mechanism 204 for controlling the movement of the overpressure wave generator, a controller 210 for controlling the operation of the overpressure wave generator 11, an echo detector 212, a data recorder 214, an image processor 216, and a display device 218. The open end of the overpressure wave generator 11 is configured such that generated overpressure waves are directed towards a target media 208. It should be understood that while the foregoing elements of the system 200 are identified separately, these elements do not necessarily have to be physically separated and can be configured in various alternative ways.

The exemplary overpressure wave generator 11 of system 200 includes a source for producing a spark, a detonation tube, a gas mixture source that provides the flowing gas into the detonation tube, and a detonator. The overpressure wave generator can alternatively comprise a group of detonation tubes that are detonated simultaneously so as to produce a combined overpressure wave. The system 200 can be implemented using one or more nozzles so as to more closely match the impedance of the detonation wave generated by the overpressure wave generator to the impedance of the ambient environment, e.g., the air, thereby reducing the reflection of energy back into the overpressure wave generator, increasing the strength of the overpressure wave that is generated, increasing the resulting force produced by the overpressure wave, and resulting in stronger conducted acoustic waves.

The overpressure wave generator is detonated to generate an overpressure wave. The force of the generated overpressure is coupled by coupling component 202 to a target media 208 such as the ground, ice, or water to produce a conducted acoustic wave. Stabilizing mechanism 204 provides stability to the movement of the overpressure wave generator 11 essentially allowing only up and down movement or substantially preventing movement altogether.

Coupling component 202 may comprise air, a liquid, a spring or may comprise rubber or some comparable compound having desired spring-like and damping characteristics, such as opposing polarity magnets. Coupling component 202 may optionally comprise an impedance transition device 206 as described previously, which directly contacts the target media 208 to impart the conducted acoustic wave. Impedance transition device 206 can have any of various types of shapes. In an exemplary embodiment, the impedance transition device 206 has a flat round shape. Under one arrangement, the impedance transition device 206 of the coupling component 202 corresponds to one or more surfaces of the coupling component 202 and, therefore, is not a separate device.

Whereas the coupling component of FIG. 2 has spring-like and damping characteristics and may include an impedance transition device, the coupling component of the present invention does not and instead comprises a coupling chamber and a push plate assembly that is in contact with a target media. The coupling chamber is substantially sealed at the moment of detonation and the pressure produced in the coupling chamber by a generated overpressure wave is applied to push plate assembly directly or via a piston thereby converting the pressure into a force thereby producing a conducted acoustic wave into the target media.

Figure 3:
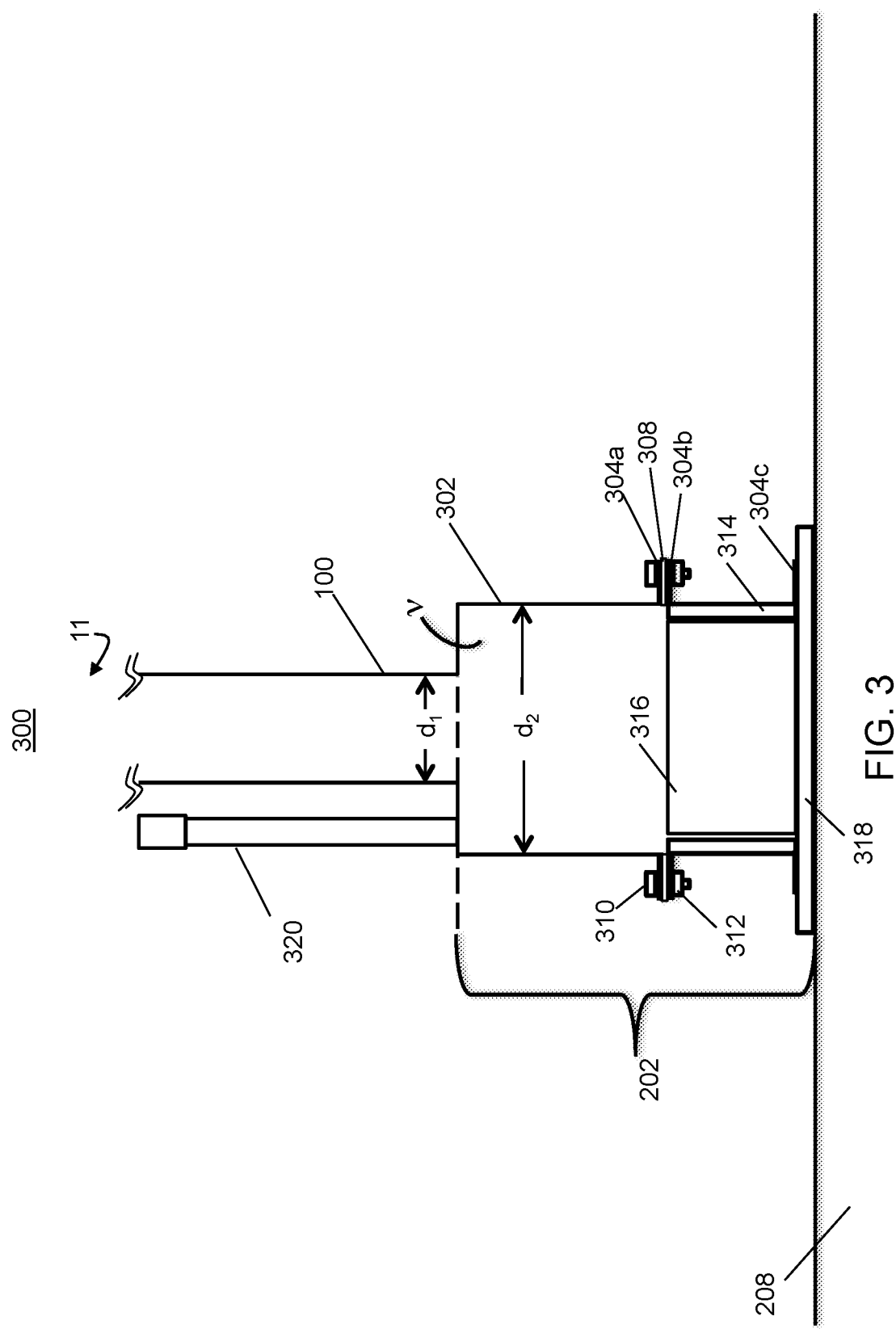
FIG. 3 depicts an exemplary coupling component that includes a coupling chamber a cylinder, a piston, and an earth plate.

FIG. 3 depicts a cross-section of an exemplary overpressure wave generator. A detonation tube 100 of an overpressure wave generator 11 is attached to a coupling component 202. The detonation tube 100 is oriented to direct a generated overpressure wave towards a target media 208. The coupling component 202 includes a coupling chamber 302, a cylinder 314, a piston 316, and an push plate assembly comprising an earth plate 318, which can be made of a rigid low mass substance such as titanium, aluminum, or composite materials such as carbon composite or fiber glass or high mass substances such as iron or steel.

The detonation tube 100 can have a first diameter $d_1$ and the coupling chamber 302 can have a second diameter $d_2$, where the diameter $d_2$ can be less than or greater than the first diameter $d_1$. Alternatively, the coupling chamber could have the same diameter as the detonation tube. The coupling chamber can also have a varying diameter and can have a shape other than a round shape, for example, an oval shape, or rectangular shape, or any other desired shape. The coupling chamber has a volume, v, in which a peak pressure is produced when the overpressure wave is generated, where the volume for a round coupling chamber is a function of its height and diameter. Overall, the diameters d1 and d2 and volume v can be selected to have a desired pressure ratio between the pressure in the detonation tube 100 and the pressure in the coupling chamber 302. For example, the pressure in the detonation tube might be on the order of 500 psi while the pressure in the coupling chamber might be on the order of 130 psi.

The coupling chamber 302 may include an outer flange 304a. The cylinder 314 may include a top outer flange 304b and may include a lower outer flange 304c. A rubber or comparable sealing component 308 can be placed between the outer flange 304a of the coupling chamber 302 and the upper outer flange 304b of the cylinder 314. Bolts 310 can be placed in holes in the two flanges 304a 304b and secured with nuts 312 in order to attach the cylinder 314 to the coupling chamber 302. Alternatively, the coupling chamber 302 and cylinder 314 can be welded together or otherwise be a single component. The area of the top of the piston 316 and the pressure applied to it determine a force versus time curve, where the force is converted into a conducted acoustic wave in the target media. The area of the plate 318 that is contact with the target media determines the distribution of the force being applied to the target media. Also shown in FIG. 3 is a vent pipe 320 which could have a nozzle, a muffler, and/or a restrictor.

Figure 4:
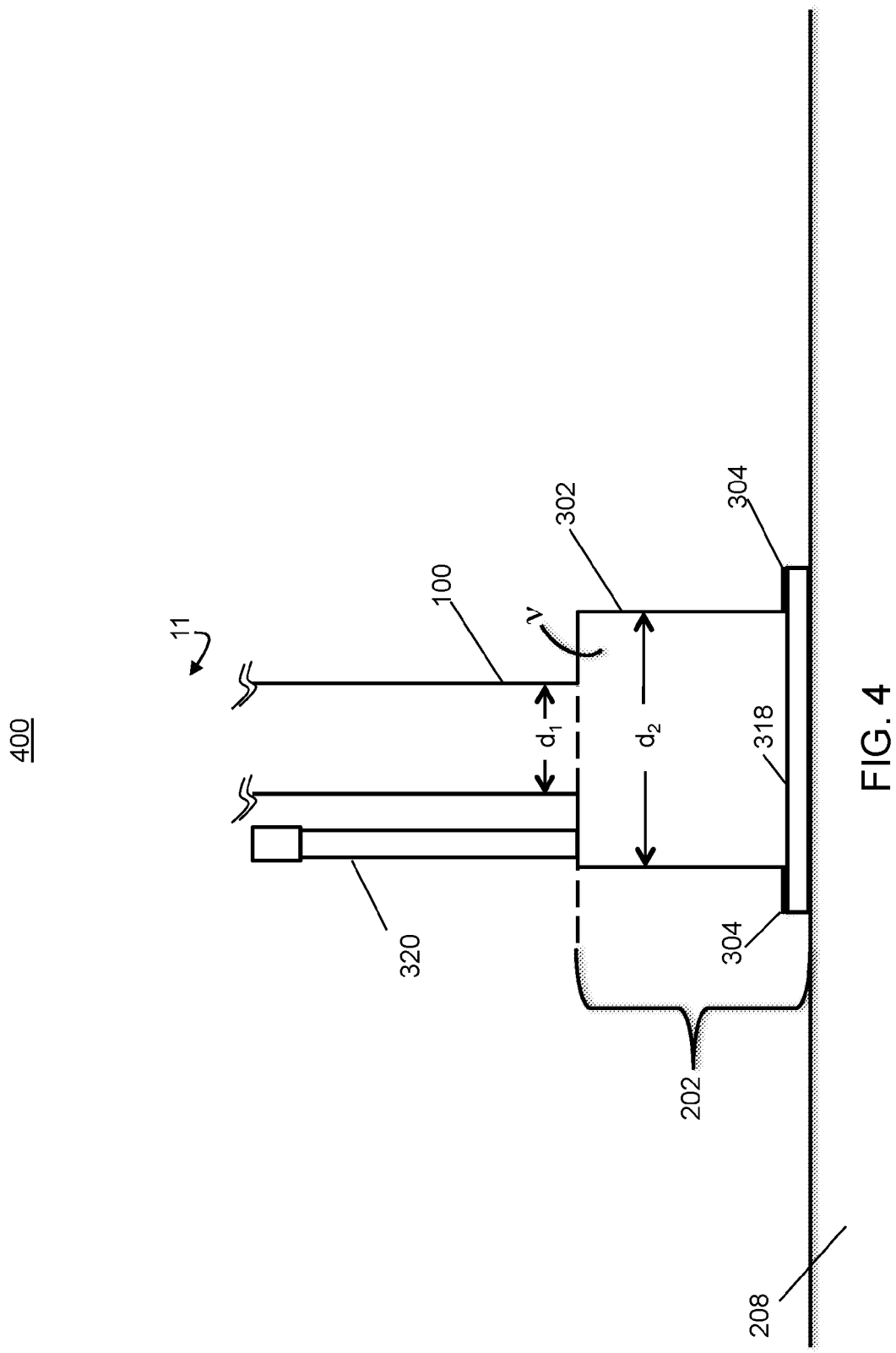
FIG. 4 depicts an exemplary coupling component that includes a coupling chamber and a push plate.

FIG. 4 depicts a cross-section of an exemplary system 400 comprising a overpressure wave generator 11 attached to a coupling component 202 that includes a coupling chamber 302 and a push plate assembly comprising an earth plate 318. The coupling chamber has an outer flange 304 that rests on the plate 318. Such an arrangement requires operation on very hard surfaces like desert earth, roadways, dams, etc.

FIG. 5A depicts a cross-section of an exemplary system 500 comprising an overpressure wave generator 11 attached to a coupling component 202 that includes a coupling chamber 302, a flexible membrane 506, and a push plate assembly comprising a top plate 504, a piston rod 510, and an earth plate 318 that is in contact with the target media. The movement of the top plate 504 and piston rod 318 are constrained in movement constraining vessel 508. The coupling chamber 302 includes an inner flange 502a that prevents the top plate 504 from moving upward. A rubber or comparable sealing component 308 is placed between the inner flange 502a (and optionally outer flange 304a) and the flexible membrane 506. The movement constraining vessel has an upper outer flange 304b and an inner flange 502b where the top plate 504 can move between the flexible membrane 506 and the inner flange 502b over a movement range 525. The top plate 504 and earth plate 318 may be rigid disks having low mass and strength such as titanium, aluminum, or composite materials such as carbon composite or fiber glass or high mass substances such as iron or steel. The piston rod 510 and movement constraining vessel may each be pipes that are also rigid and low mass and may be titanium, aluminum, or composite materials such as carbon composite or fiber glass or high mass substances such as iron or steel.

Figure 5B:
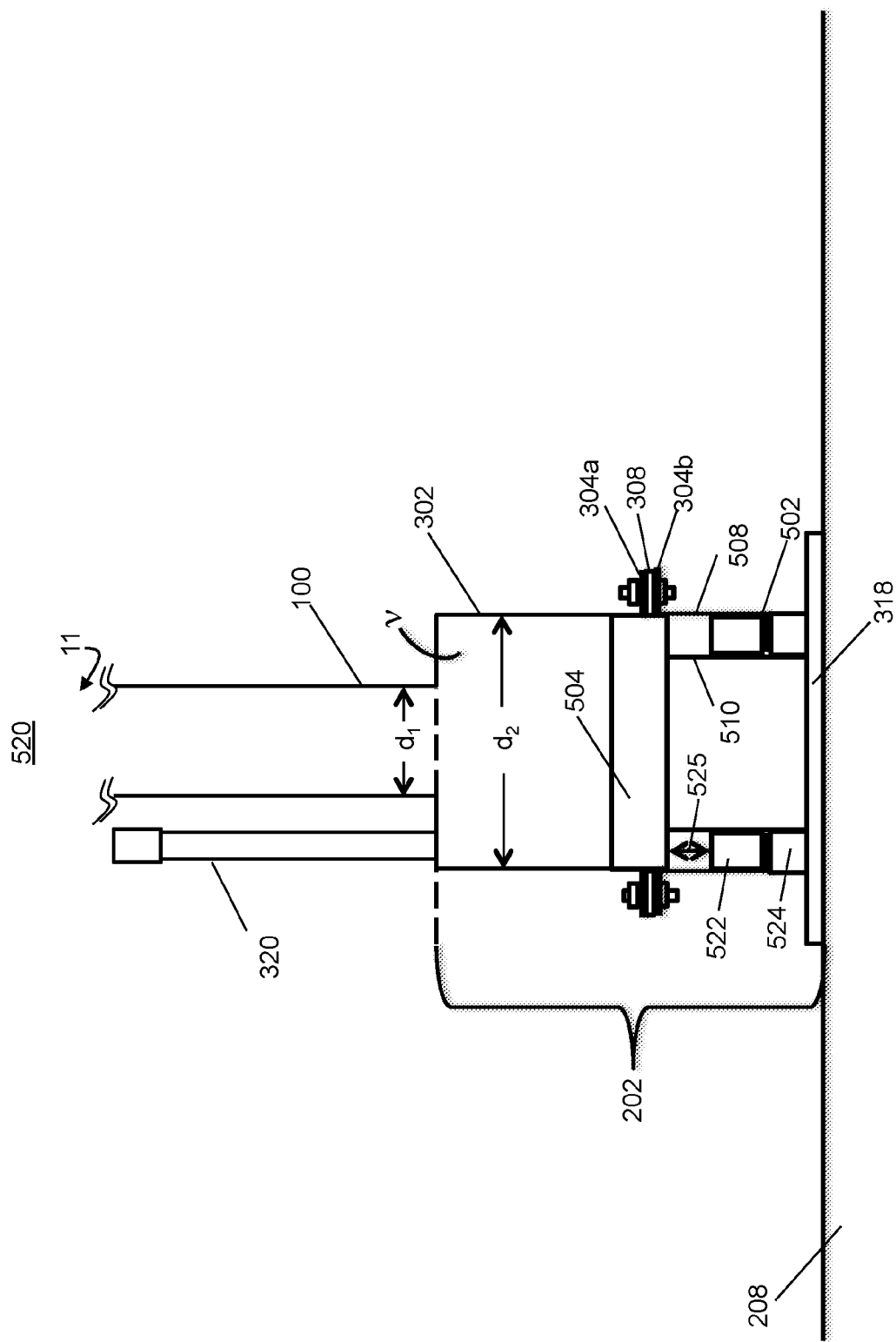
FIG. 5B depicts an exemplary coupling component that includes a coupling chamber, a movement constraining vessel, a stabilizing component, a push plate assembly comprising a top plate, a piston rod, and an earth plate, and a stop component.

FIG. 5B depicts a cross-section of an exemplary system 520 comprising an overpressure wave generator 11 attached to a coupling component 202 that includes a coupling chamber 302, and a push plate assembly comprising a top plate (or piston) 504, a piston rod 510, and an earth plate 318 that is in contact with the target media. The downward movement of the top plate 504 and piston rod 318 are constrained in movement constraining vessel 508. The coupling chamber 302 includes an outer flange 304a. A rubber or comparable sealing component 308 is placed between the outer flange 304a of the coupling chamber 302 and the upper outer flange 304b of the movement constraining vessel 508. The movement constraining vessel has an upper outer flange 304b, a lower inner flange 502, and includes a stabilizing component 522, where the top plate 504 can move downward (or the coupling component 302 can move upward) over a movement range 525 until the top plate 504 strikes the stabilizing component 522. The stabilizing component is shown being slightly above the lower inner flange 502 (for clarity's sake) but can instead be abutted against the lower inner flange 502. The stabilizing component can be any type of mechanism that constrains movement of the piston rod 510 to only movement that is parallel to the sides of the coupling chamber and movement constraining vessel 508.

A stop component 524, for example a doughnut-shaped rubber stop component, is depicted between the earth plate 318 and the lower inner flange 502 of the movement constraining vessel. Its purpose is to prevent the metal lower inner flange 502 from striking the metal earth plate 318 and thereby prevent the sound of metal striking metal from being produced and prevent damage. Although a rubber stop component 524 is described herein, any other desired material could be used instead of rubber. For clarity's sake, the rubber stop component 524 is depicted being slightly below the lower inner flange 502. However, in normal operation, the lower inner flange 502 could rest upon the rubber stop component 524 prior to detonation such as depicted in FIG. 5C. The thicknesses of the rubber stop 318 and stabilizing component 522 can be selected to limit the movement of the piston rod 510 during a detonation to a desired movement range 525 (e.g., a distance of three inches). This limiting of movement to the movement range 525 can be visualized by comparing FIGS. 5C and 5D, which depict the location of the piston rod 510 prior to detonation and immediately after detonation, respectively. As with the exemplary system 520, the top plate 504 and earth plate 318 of the system 520 may be rigid disks having low mass and strength such as titanium, aluminum, or composite materials such as carbon composite or fiber glass. The piston rod 510 and movement constraining vessel 508 may each be pipes that are also rigid and low mass and may be titanium, aluminum, or composite materials such as carbon composite or fiber glass or high mass substances such as iron or steel.

Figure 5E:
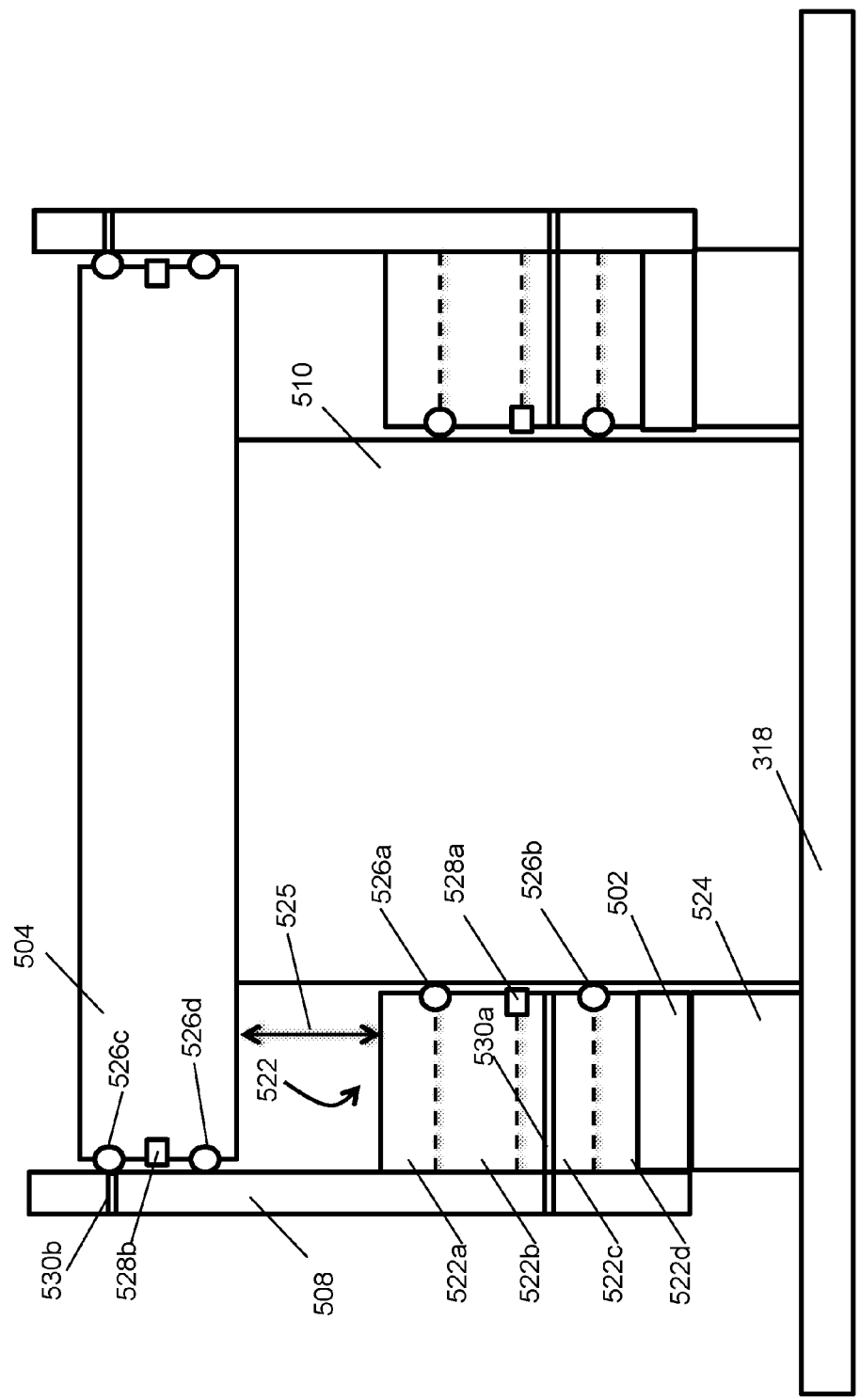
FIG. 5E depicts an exemplary stabilizing component.

FIG. 5E depicts a cross section of an exemplary stabilizing component 522. Referring to FIG. 5E stabilizing component 522 comprises four discs 522a-522d, two O-rings 526a 526b, a grease spreading component 528a, and at least one grease port 530a. The stabilizing component 522 could be a circular ring or multiple rings attached together. In FIG. 5E, stabilizing component 522 comprises four circular rings 522a-522d that are attached by bolts (not shown), which can be loosened to allow the piston rod 510 to be placed into the movement constraining vessel 508, after which the bolts can be tightened causing the O-rings 526a 526b to press against the piston rod 510. The distance between the stabilizing component 522 and top plate 504 correspond to a movement range 525. During operation, a grease pump (not shown) can periodically provide grease to the at least one grease port 530a, where the grease is spread by the grease spreading component 528a during operation of the device. FIG. 5E also depicts O-rings 526c 526d on the outside of the top plate (or piston) 504, where during operation, grease is periodically provided to at least one grease port 530b and the grease is spread by a grease spreading component 528b. One skilled in the art will recognize that all sorts of stabilizing approaches can be employed to include having O-rings integrated into the piston rod 510, use of a bushing, use of a rubber doughnut-shape ring similar to the stop component, and the like. Alternatively, the stabilizing component 522 could be permanently packed with grease.

In accordance with one aspect of the present invention, a mass m is accelerated over a vertical movement range using a pressure p (psi) produced within a coupling component 302 by a detonation that is applied to a piston (or top plate) having a surface area ($in^2$) that produces a resultant force F, where an acceleration (a) of the mass (m) determines the resulting force F (i.e., F=ma) that conducts an acoustic wave into a target media. For example, referring to FIGS. 5C and 5D, the accelerated mass comprises the portions of the system 520 that moves upward upon detonation of the overpressure wave generator 11 when the pressure produced in the coupling component 302 is applied to the top plate 504, where the mass may also include the weight of another object such as a backhoe tractor used to increase the mass of a system such as described in U.S. Non-provisional Pat. No. 8,905,186, issued Dec. 9, 2014, which is incorporated by reference herein in its entirety. Alternatively, a mass can be configured in accordance with the invention to have a downward vertical movement when a detonation occurs, as described below. Generally, for a given mass and a given pressure resulting from a given detonation, a range of vertical movement can be configured for the mass in accordance with the invention, where the mass can be configured to move upward or downward to achieve an acceleration that results in a desired resulting force that conducts an acoustic wave into a target media. One skilled in the art will recognize that for a given strength of a detonation produced by an overpressure wave generator 11 and a corresponding pressure produced in the coupling component 302, various engineering trades exist. For example, the same force produced by moving a first mass over a first movement range can be produced by moving a second lighter mass over a second greater movement range, where the lighter mass may be achieved by using lighter materials such as titanium instead of iron. Alternatively, the same force produced by moving first mass over a first movement range can be produced by moving a second greater mass over a second lessor movement range. Generally, one skilled in the art will recognize that the strength of a detonation, the weight of a mass, and a movement range may be tuned to move a mass a distance equal to or less than a movement range to achieve a desired acceleration that produces a desired resulting force that conducts an acoustic wave into a target media. Moreover, various parameters of the invention can be varied other than weight of the mass can to achieve a desired resulting force such as a diameter of a detonation tube 100, a diameter of a coupling component 302, a diameter of a piston rod 510, characteristics of the fuel-oxidant mixture, the number of detonation wave generators 11, the number of detonation tubes 100, etc.

FIGS. 5F-5I depict two examples of increasing a movement range 525 of a system in accordance with the invention.

Figure 5G:
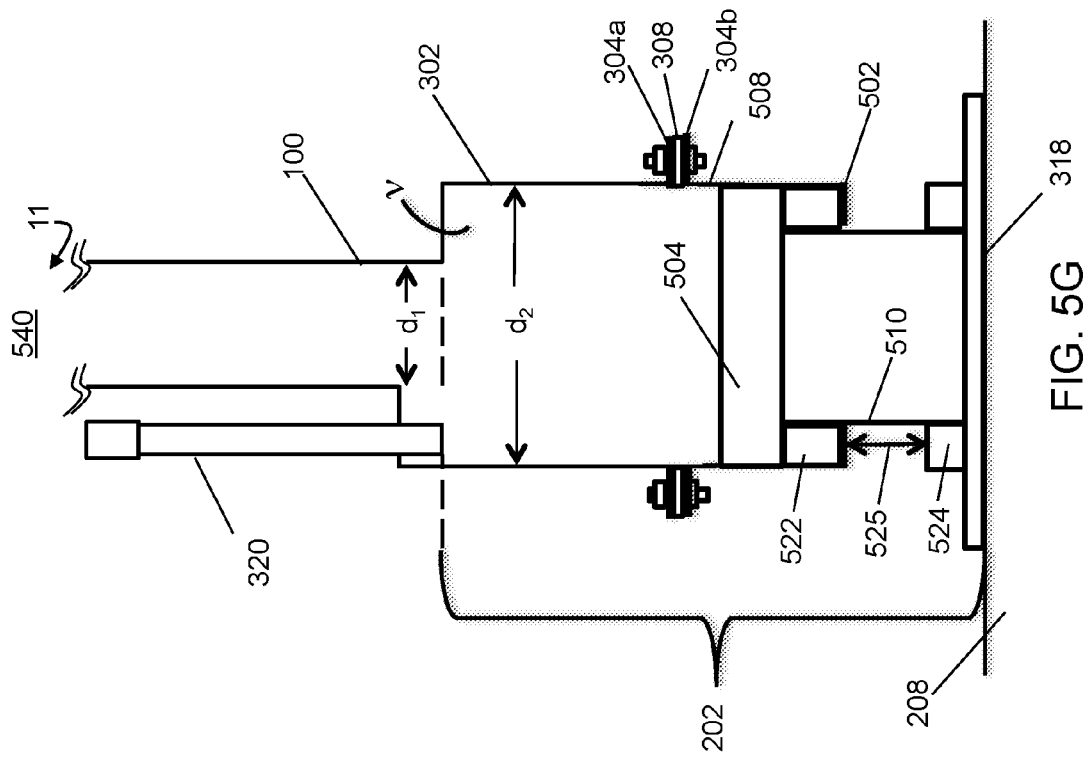
FIG. 5G depicts an exemplary coupling component of FIG. 5F immediately after detonation.
Figure 5F:
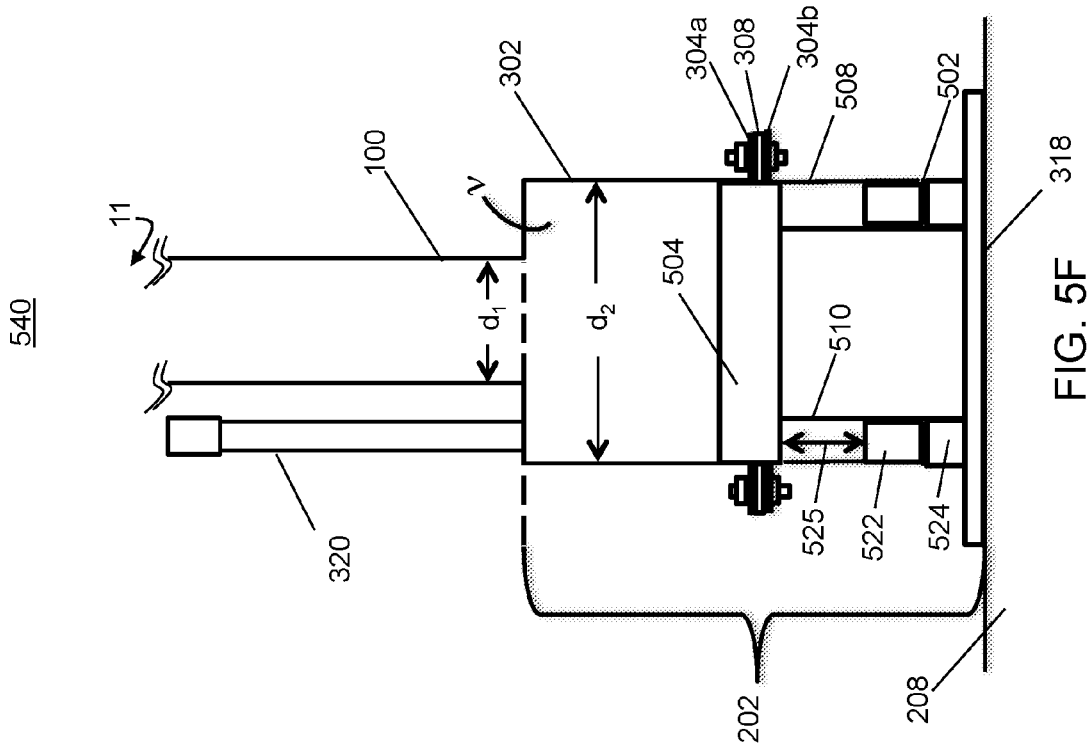
FIG. 5F depicts an exemplary coupling component prior to detonation that is the same as the exemplary coupling component of FIG. 5B except the piston rod and movement constraining vessel have both been lengthened.

FIG. 5F depicts a cross-section of an exemplary system 540 comprising an overpressure wave generator 11 attached to a coupling component 202 that is the same as the exemplary system 520 of FIG. 5B except the piston rod 510 and the movement constraining vessel 508 have both been lengthened so as to increase the movement range 525.

FIG. 5G depicts a cross-section of an exemplary system 540 of FIG. 5F immediately after detonation.

FIG. 5H depicts a cross-section of an exemplary system 542 comprising an overpressure wave generator 11 attached to a coupling component 202 that is the same as the exemplary system 520 of FIG. 5F except the piston rod 510 and movement constraining vessel 508 have both been lengthened so as to increase the movement range 525.

FIG. 5I depicts a cross-section of the exemplary system 542 of FIG. 5H immediately after detonation.

Figure 6A:
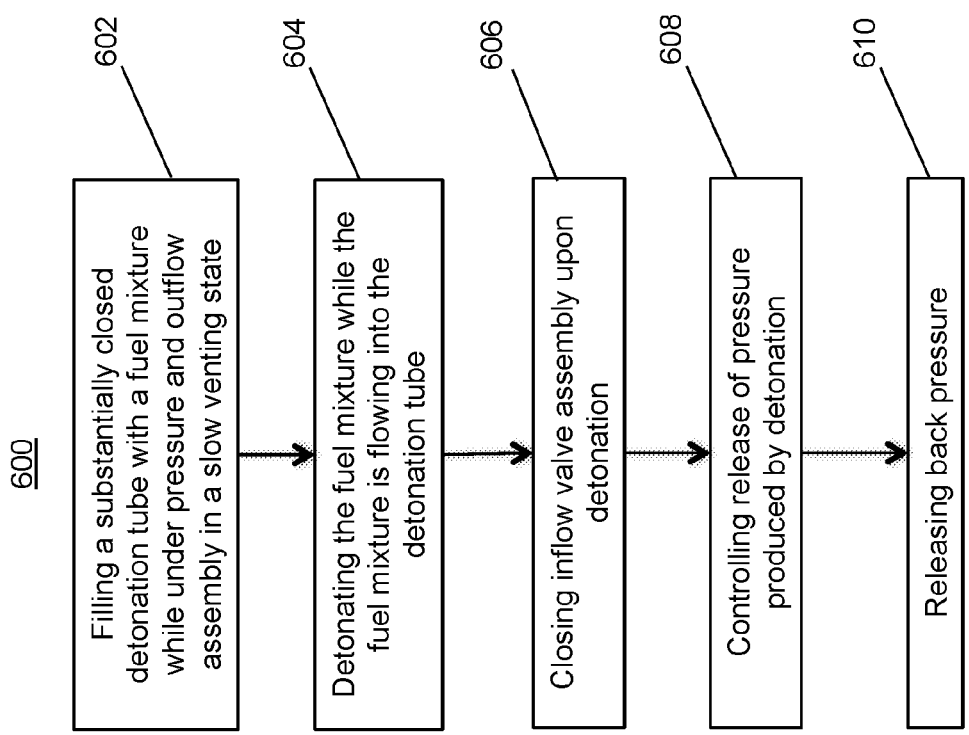
FIG. 6A depicts a first exemplary method for harnessing pressure produced by a detonation.

In accordance with one aspect of the present invention, the release of pressure produced by a detonation within an overpressure wave generator of a seismic exploration system is controlled, such as described in U.S. Non-Provisional application Ser. No. 14/699,742, which was previously incorporated herein by reference. FIG. 6A depicts an exemplary method 600 for operating a seismic exploration system in accordance with the present invention that includes the controlled release of pressure. Referring to FIG. 6A, the exemplary method 600 includes a step 602 of filling a detonation tube with a fuel mixture while under pressure and an outflow assembly is in a slow flow state, and a step 604 of detonating the fuel mixture fuel is flowing into the detonation tube. The method also includes a step 606 of closing an inflow valve assembly upon detonation, a step 608 of controlling the release of pressure produced by detonation, and a step 610 of releasing back pressure.

The step 602 of filling a detonation tube with a fuel mixture while under pressure involves allowing air to exit the system on a first detonation (or shot) of a system or allowing exhaust to exit the system on a successive detonation (or shot) of a system, where air or exhaust may be flushed from the system at atmospheric pressure or may be allowed to leak as the system is pressurized.

Step 608 of controlling release of pressure produce by detonation and step 610 of releasing back pressure may involve waiting for pressure to leak out of the system and/or may involve a rapid discharge of pressure from the system.

Figure 6B:
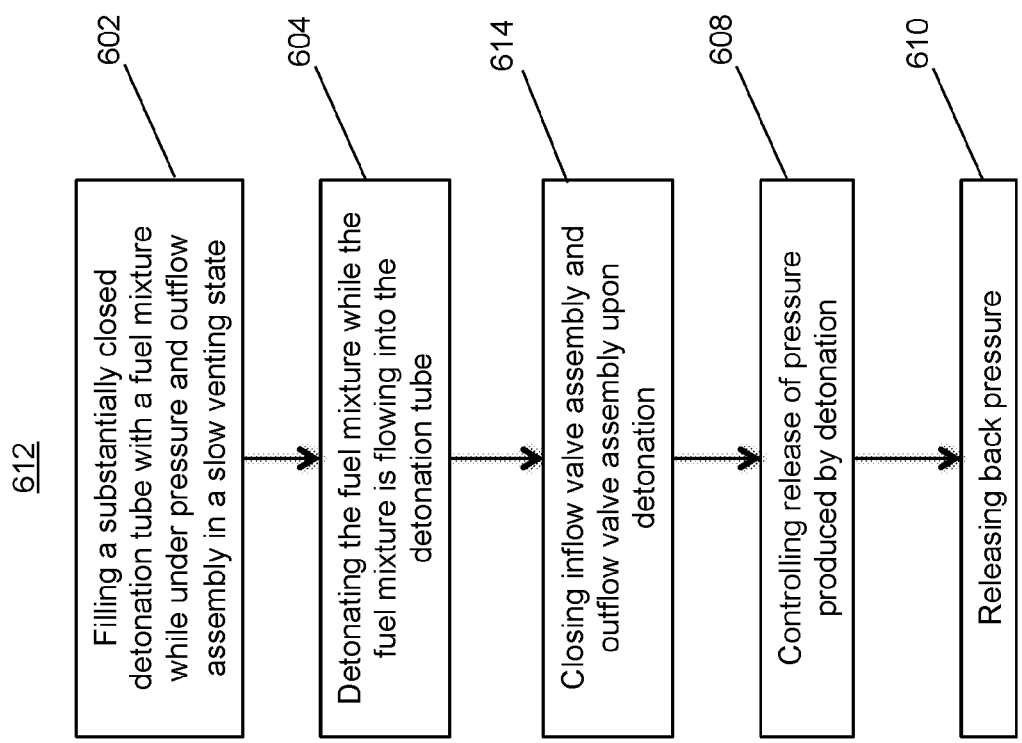
FIG. 6B depicts a second exemplary method for harnessing pressure produced by a detonation.

FIG. 6B depicts another exemplary method 612 for operating a seismic exploration system in accordance with the present invention that is the same as the method 600 of FIG. 6A except after detonating the fuel mixture both the inflow valve assembly and an outflow valve assembly are closed (i.e., step 614 replaces step 606).

Figure 6C:
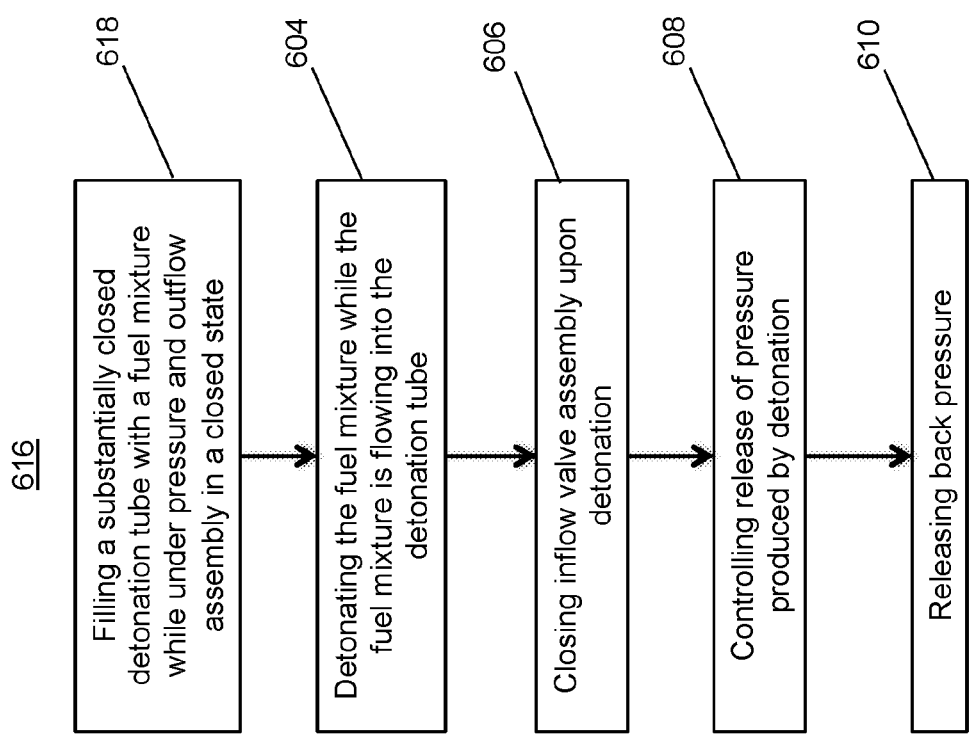
FIG. 6C depicts a third exemplary method for harnessing pressure produced by a detonation.

FIG. 6C depicts another exemplary method 616 for operating a seismic exploration system in accordance with the present invention that is the same as the method 600 of FIG. 6A except the detonation tube is filled with a fuel mixture while under pressure and an outflow assembly is in closed state (i.e., step 616 replaces step 602).

Figure 7A:
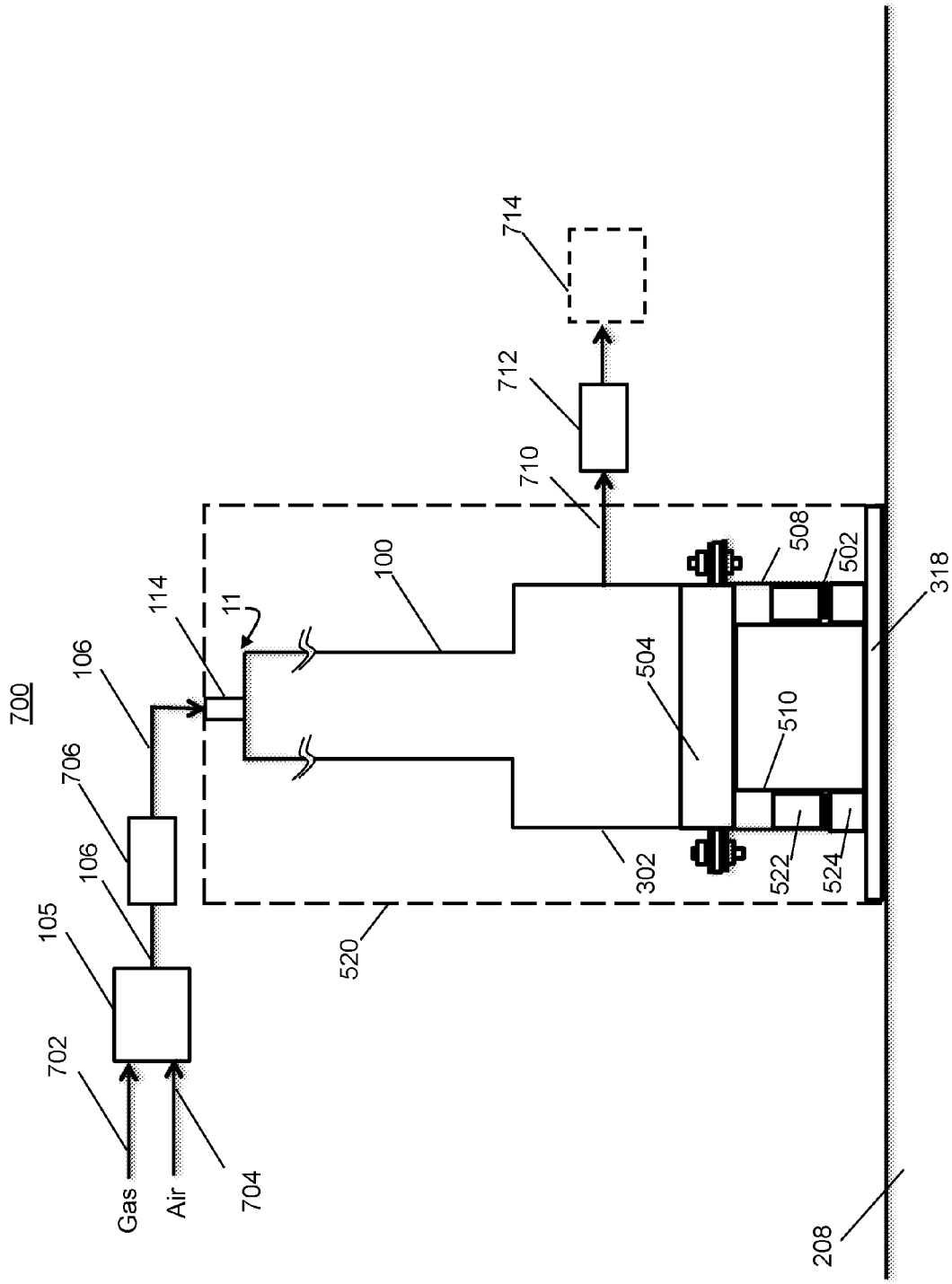
FIG. 7A depicts an exemplary seismic exploration system having an inflow valve assembly and an outflow valve assembly.

FIG. 7A depicts an exemplary seismic exploration system 700 having an inflow valve assembly 706 and an outflow valve assembly 712. Referring to FIG. 7A, gas 702 and air 704 are mixed in a fuel mixture supply 105 and a fuel mixture 106 is provided to an inflow valve assembly that is between the fuel mixture supply 105 and a detonator 114 that receives the fuel mixture 106. The fuel mixture 106 fills the detonation and coupling portion 520 of the system 700 causing air (initial shot) or exhaust (successive shots) 710 to exit into the outflow valve assembly 712 and out of the outflow valve assembly 712 to an optional muffler 714.

FIG. 7B depict an exemplary detonation wave pressure harnessing system 720. Referring to FIG. 7B, gas 702 and air 704 are mixed in a fuel mixture supply 105 and a fuel mixture 106 is provided to an inflow valve assembly that is between the fuel mixture supply 105 and a detonator 114 that receives the fuel mixture 106. The fuel mixture 106 fills the detonation portion 722 of the system 720 causing air (initial shot) or exhaust (successive shots) 710 to exit into the outflow valve assembly 712 and out of the outflow valve assembly 712 to an optional muffler 714. As shown, the detonation tube 100 of the detonation portion 722 includes a piston 316 that interfaces with a load 724. As such, where the piston 316 of an exemplary seismic exploration system interfaces with a target media such as the ground, ice, or water, the piston 316 of the exemplary detonation wave pressure harnessing system 720 interfaces with a load.

In accordance with another aspect of the invention, one or more pressure waves can enter a coupling chamber from one or more directions, where opposing pressure waves can enter the coupling chamber from opposing sides of the chamber.

Figure 8A:
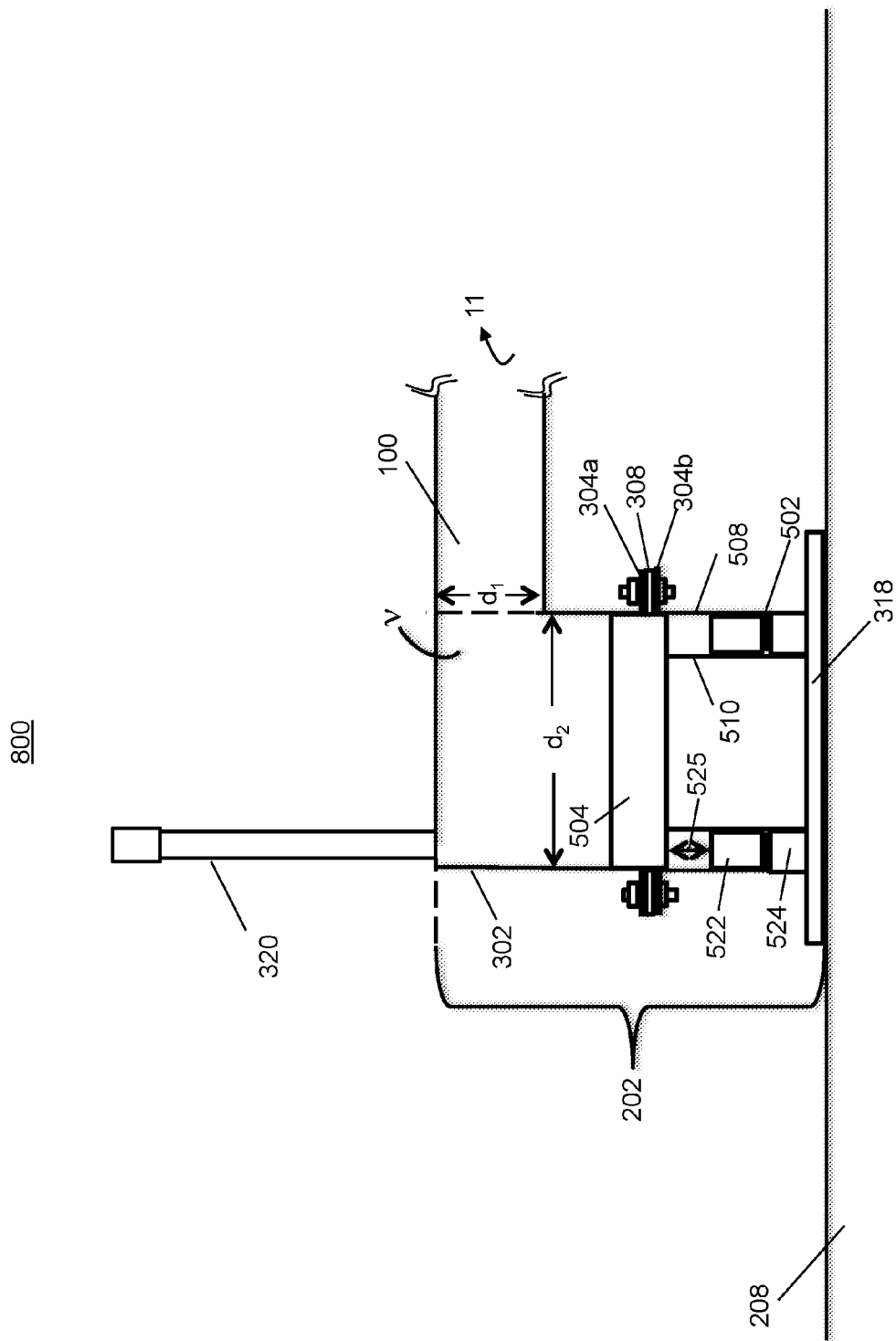
FIG. 8A depicts an exemplary system like the exemplary system of FIG. 5B except the detonation tube and corresponding overpressure wave generator are connected to the right side of the coupling chamber instead of to the top of the coupling chamber.

FIG. 8A depicts an exemplary system 800 like the exemplary system 520 of FIG. 5B except the detonation tube 100 and corresponding overpressure wave generator 11 are connected to the right side of the coupling chamber 302 instead of to the top of the coupling chamber 302.

Figure 8B:
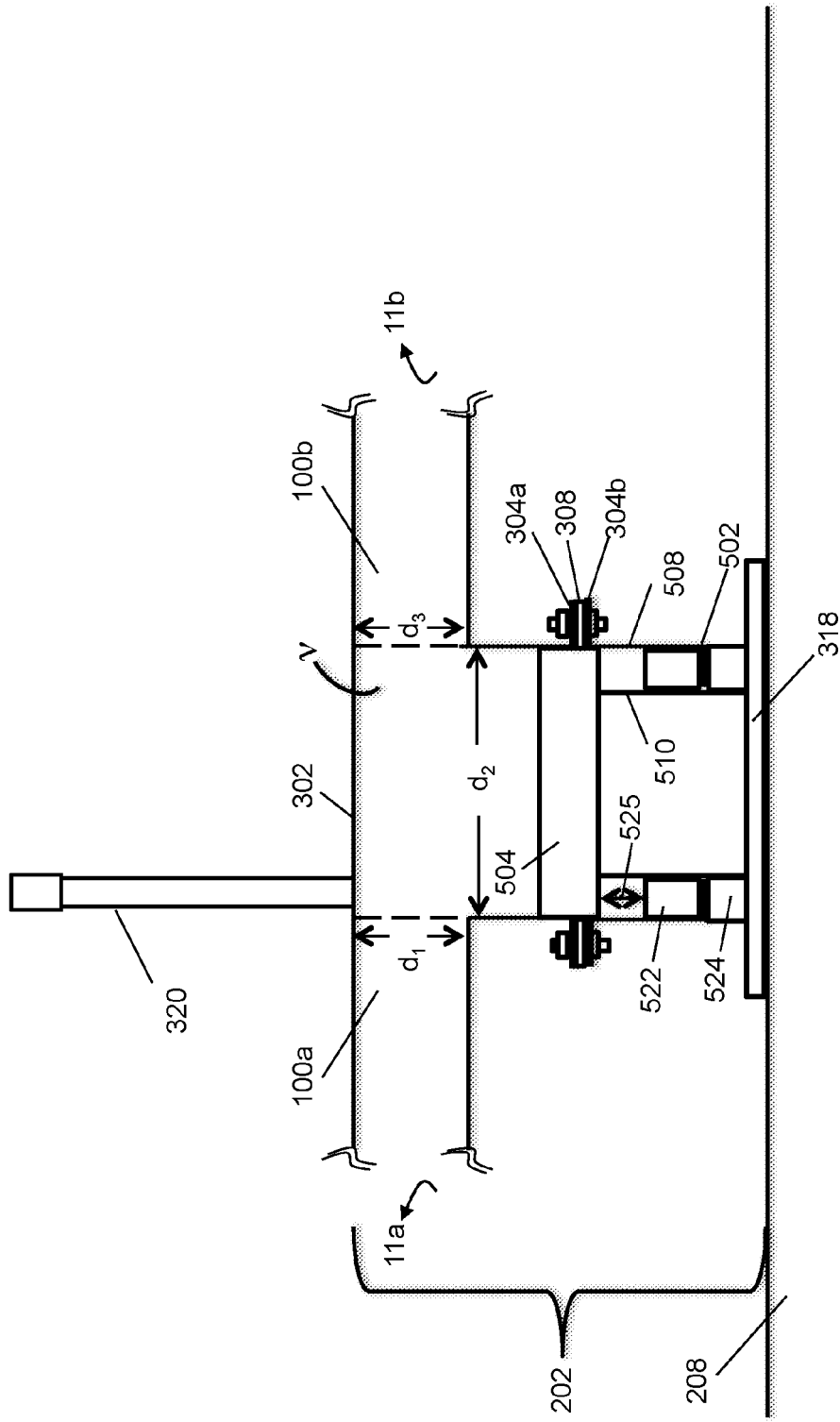
FIG. 8B depicts an exemplary system like the exemplary system of FIG. 8A except a plurality of detonation tubes and corresponding overpressure wave generators are connected to the left and right sides of the coupling chamber instead of to the top of the coupling chamber.

FIG. 8B depicts an exemplary system 802 like the exemplary system 800 of FIG. 8A except detonation tubes 100a 100b and corresponding overpressure wave generators 11a 11b are connected to the left and right sides of the coupling chamber 302 instead of to the top of the coupling chamber 302. As such, the two detonation tubes 100a 100b are 180 degrees rotated relative to one another such that they face each other. Similarly, three detonation tubes might be located every 120 degrees about the chamber 302 or four detonation tubes might be located every 90 degrees, and so on. Alternatively, the detonation tubes might be arranged with different angles between them. Moreover, the diameters d1 d3 of the two detonation tubes 100a 100b can be the same or different. Generally, multiple detonation tubes can be used to produce detonation waves that combine in the coupling chamber 302 to produce a pressure that produces a resulting force, where the detonations may be substantially the same or may be different. Moreover, various combinations of one or more detonation tubes may have simultaneous detonations or may have detonations at different times, which may be in accordance with a timing code. One skilled in the art will also understand that a greater pressure can be achieved when the chamber 302 is smaller rather than larger.

FIG. 9A depicts an exemplary system 900 having a coupling component 302 prior to detonation that is similar to the exemplary coupling component of FIG. 8A except the coupling component 302 is beneath a piston 504 and piston rod 510, and where the coupling component is physically attached (e.g., welded) to the earth plate 318. As such, when the detonation occurs, as depicted in FIG. 9B, pressure in the coupling component 302 causes an upward force to be applied to the piston 504 that causes the piston and attached piston rod 520 to move upward.

Figure 9C:
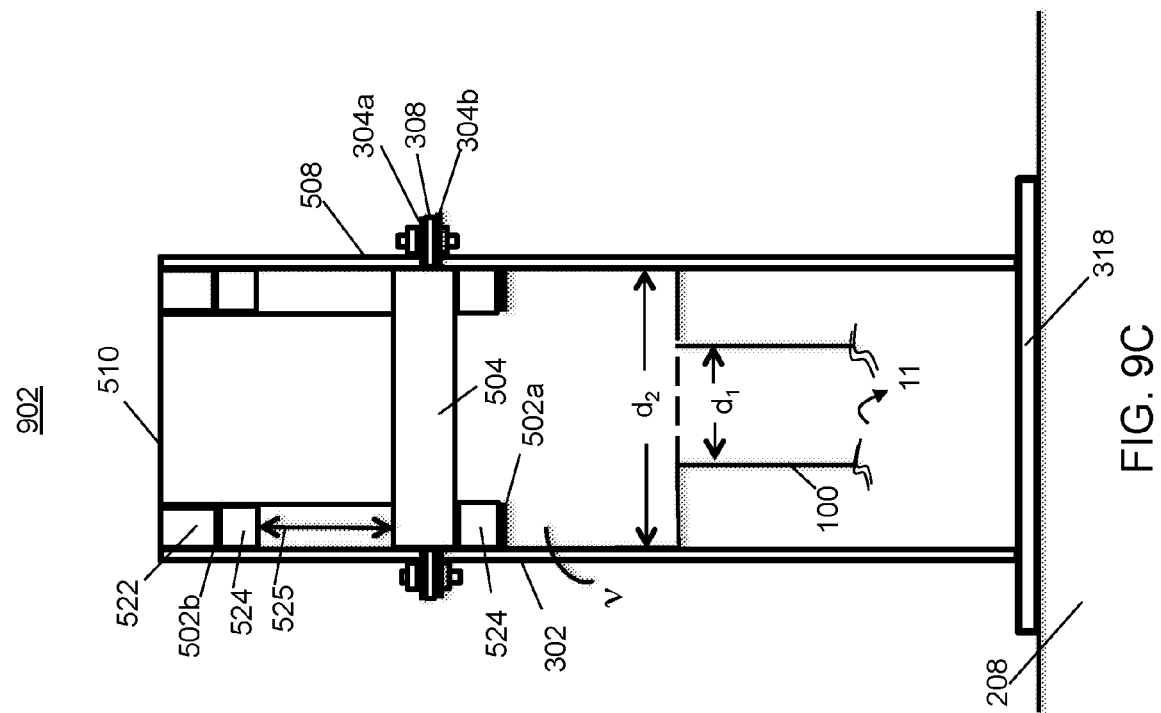
FIG. 9C depicts the exemplary system like that of FIG. 9A except the detonation tube and corresponding overpressure wave generator are attached to the bottom of the coupling chamber.

FIG. 9C depicts the exemplary system 902 like that of FIG. 9A except the detonation tube 100 and corresponding overpressure wave generator 11 are attached to the bottom of the coupling chamber 302.

FIGS. 9D and 9E depict the exemplary system 900 of FIGS. 9A and 9B except an external mass 906 provides a downward force on the piston rod 510. The external mass 906 could be, for example, the weight of a backhoe tractor or a large container full of a liquid such as water or some other liquid. The use of an external mass enables a system 900 to be transported to a location and then the external mass 906 can be provided to the system 900.

Figure 9F:
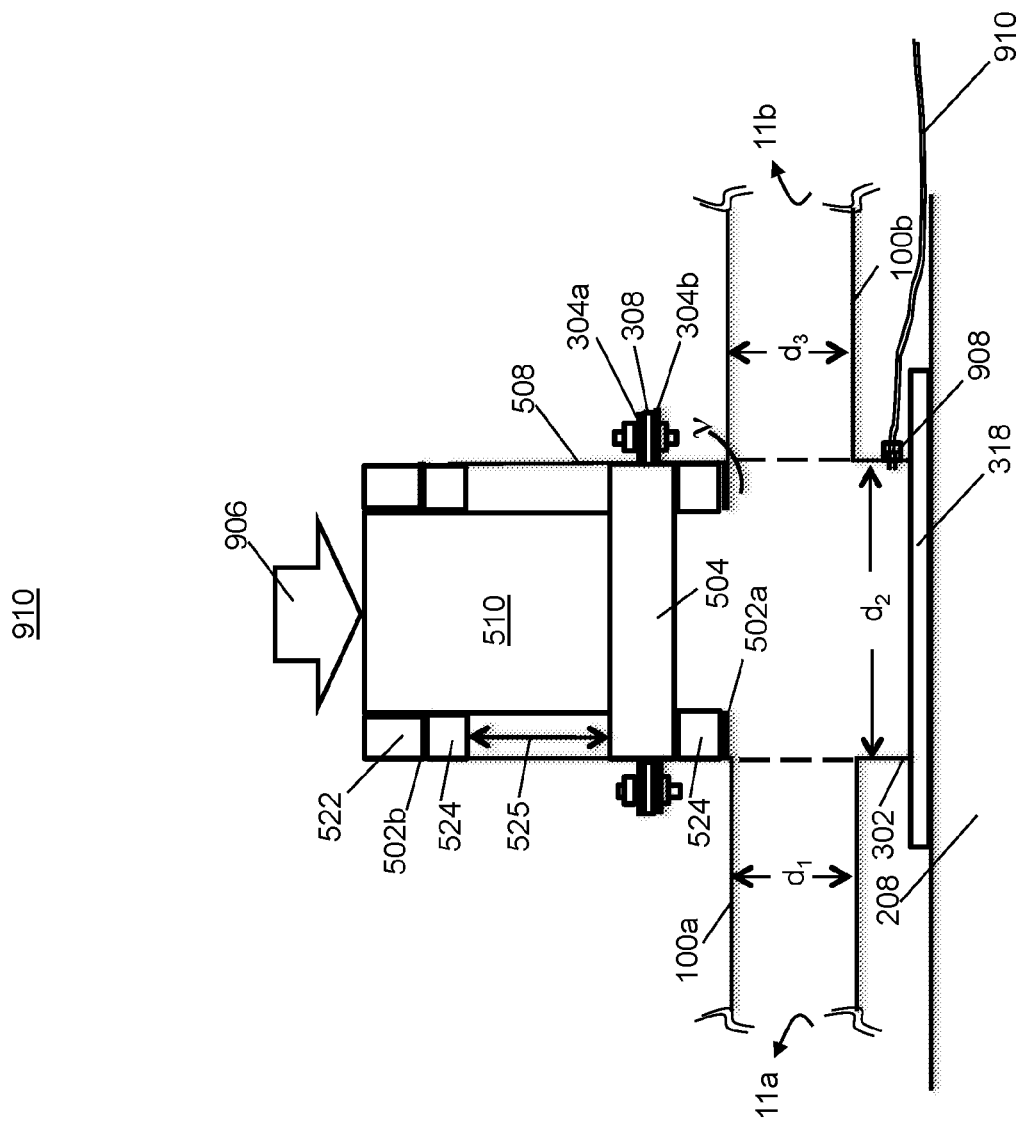
FIG. 9F depicts an exemplary system like that of FIGS. 9A-9E except a plurality of detonation tubes and corresponding overpressure wave generators are connected to the left and right sides of the coupling chamber.

FIG. 9F depicts an exemplary system 910 that is substantially the same as the system 900 of FIGS. 9A, 9B, 9C, and 9D and the system 902 of FIG. 9C except detonation tubes 100a 100b and corresponding overpressure wave generators 11a 11b are connected to the left and right sides of the coupling chamber 302. As such, the two detonation tubes 100a 100b are 180 degrees rotated relative to one another such that they face each other. Similarly, three detonation tubes might be located every 120 degrees about the chamber 302 or four detonation tubes might be located every 90 degrees, and so on. Alternatively, the detonation tubes might be arranged with different angles between them. Moreover, the diameters d1 d3 of the two detonation tubes 100a 100b can be the same or different. Generally, multiple detonation tubes can be used to produce detonation waves that combine in the coupling chamber 302 to produce a pressure that produces a resulting force, where the detonations may be substantially the same or may be different. Moreover, various combinations of one or more detonation tubes may have simultaneous detonations or may have detonations at different times, which may be in accordance with a timing code.

FIG. 9F also depicts an optional thermocouple 908 and wire leads 910 that can be used to directly measure the transient temperature of the gas within the coupling chamber 302, where the leads 910 would be connected to electronics device, which is not shown, for example, a control system or a digital display outputting the measured temperature. In one arrangement, the measured transient temperature is sampled at a sample rate and the measurement samples are stored, for example, in a memory or a hard drive.

In accordance with another aspect of the invention, a seismic exploration system similar to the system 900 shown in FIG. 9A can be configured to lie on its side and be physically attached to the target media, such that the resulting force produced by the system will conduct a plane shear wave into the target media. If two such systems are oriented in parallel and facing in opposite directions, their resulting forces will conduct a spherical shear wave into the target media. Discussions relating to the conducting of shear waves are provided in U.S. Non-provisional Pat. No. 8,292,022, which has been previously incorporated herein by reference.

Figure 10:
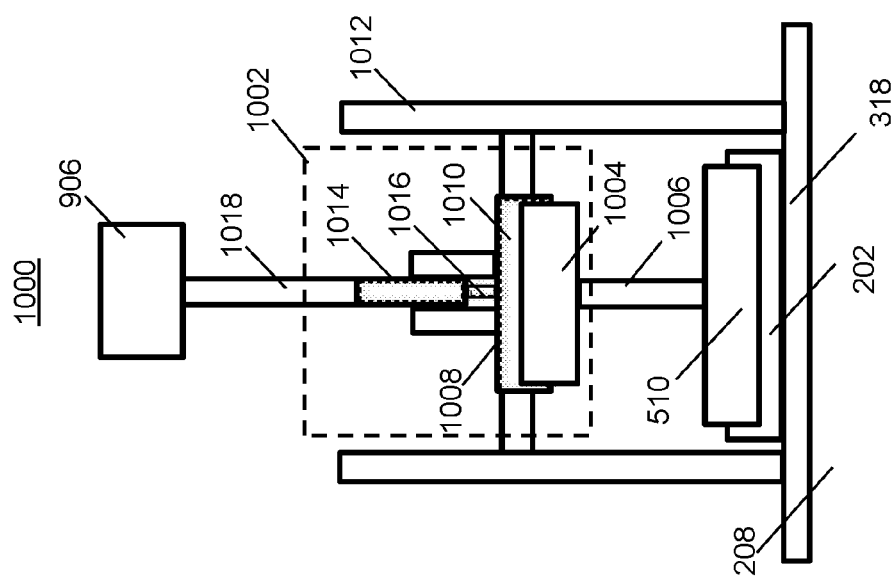
FIG. 10 depicts an exemplary seismic exploration system that uses a hydraulics transformer subsystem to lift a mass.

In accordance with another aspect of the invention depicted in FIG. 10, an exemplary seismic exploration system 1000 uses a hydraulics transformer subsystem 1002 to lift a mass 906. Referring to FIG. 10, a coupling component 202 sits on an earth plate 202 that is in contact with a target media 208. The coupling component 202 receives an overpressure wave via a detonation tube 100 (not shown) that applies an upward force on a first piston 510, where the piston 510 and coupling component 202 are configured to have a relatively wide diameter but short height. The first piston 510 is coupled to a second piston 104 via a rod 1006. The second piston moves inside a first hydraulic cylinder 1008 that includes a hydraulic fluid 1010. The first hydraulic cylinder 1008 is supported by a frame assembly 1012 that is physically attached to the earth plate 318. The first hydraulic cylinder 1008 is connected to a second hydraulic cylinder 1014 having a much smaller diameter than the first hydraulic cylinder by a hose or pipe 1016. The second hydraulic cylinder includes a third narrow diameter piston 1018 that is attached to the mass 906. Thus, by coupling the upward force to the second piston 1004 inside the first hydraulic cylinder 1008 a large fluid flow at high pressure will be produced that is coupled to the smaller diameter cylinder 1014 which is also fastened to the ground plate 318 via the frame assembly 1012. The third piston 1018 will then have a large movement at lower total force which then lifts the mass 906.

Figure 11:
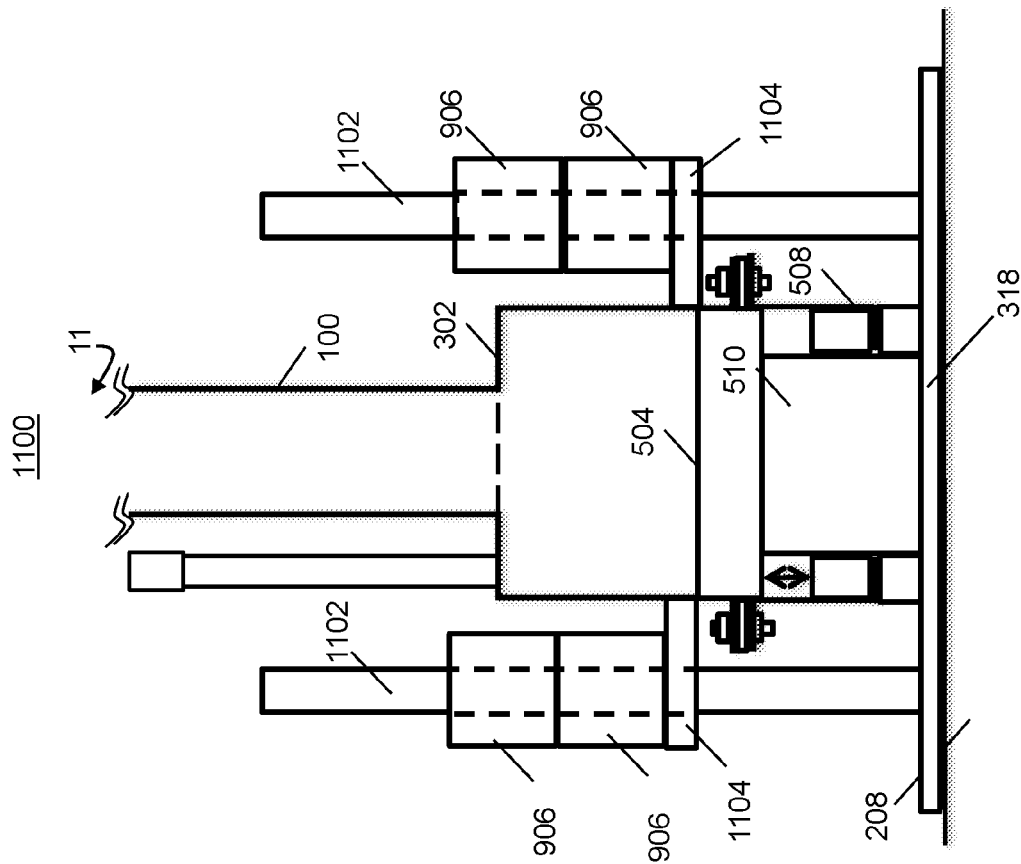
FIG. 11 depicts an exemplary seismic exploration system that is similar to the system of FIG. 5B but which also has a tunable mass capability.

In accordance with another aspect of the invention, an external mass 906 may be tunable. FIG. 11 depicts an exemplary system 1100 is similar to system 520 of FIG. 5B but has a tunable mass capability. Referring to FIG. 11, the system 1100 includes one or more rods 1102 (or tracks) that are physically attached to an earth plate 318 that is in contact with a target media 208. Attached to the coupling chamber 302 are mass support elements 1104 that are configurable for supporting one or more masses 906 (e.g., weight blocks) and which can move up and down on the rods 1102 as the coupling chamber and other portions of the system move upward and downward during and after a detonation by the overpressure wave generator 11. Generally, all sort of variations are possible for providing a tunable mass to a system in accordance with the invention.

In accordance with another aspect of the invention, valves can be used to control the downward movement of the mass of a system after a detonation so as prevent damage, noise, conducted a secondary acoustic wave, etc. The use of valves for such purposes was described above and is also described more fully in U.S. Non-Provisional application Ser. No. 14/811,614, which was previously incorporated herein by reference.

In accordance with another aspect of the invention, one or more damping elements and/or one or more springs can be placed between moving and non-moving portions of a seismic exploration system. One skilled in the art of using such damping elements and springs will recognize the various locations that such components can be placed between moving and non-moving portions of the system.

Figure 12A:
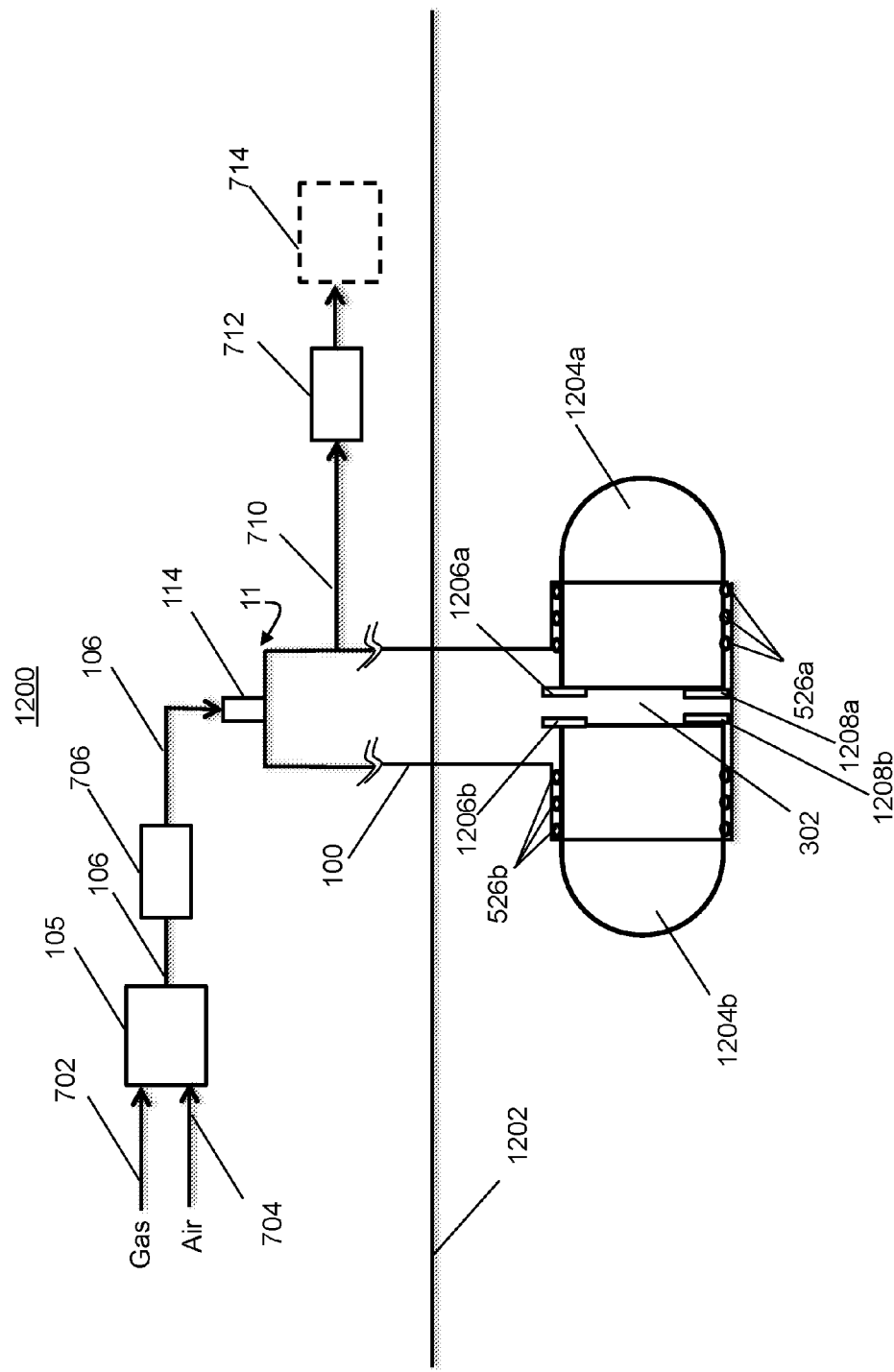
FIGS. 12A and 12B depict an exemplary seismic exploration system configured to be at least partially submerged in water.
Figure 12B:
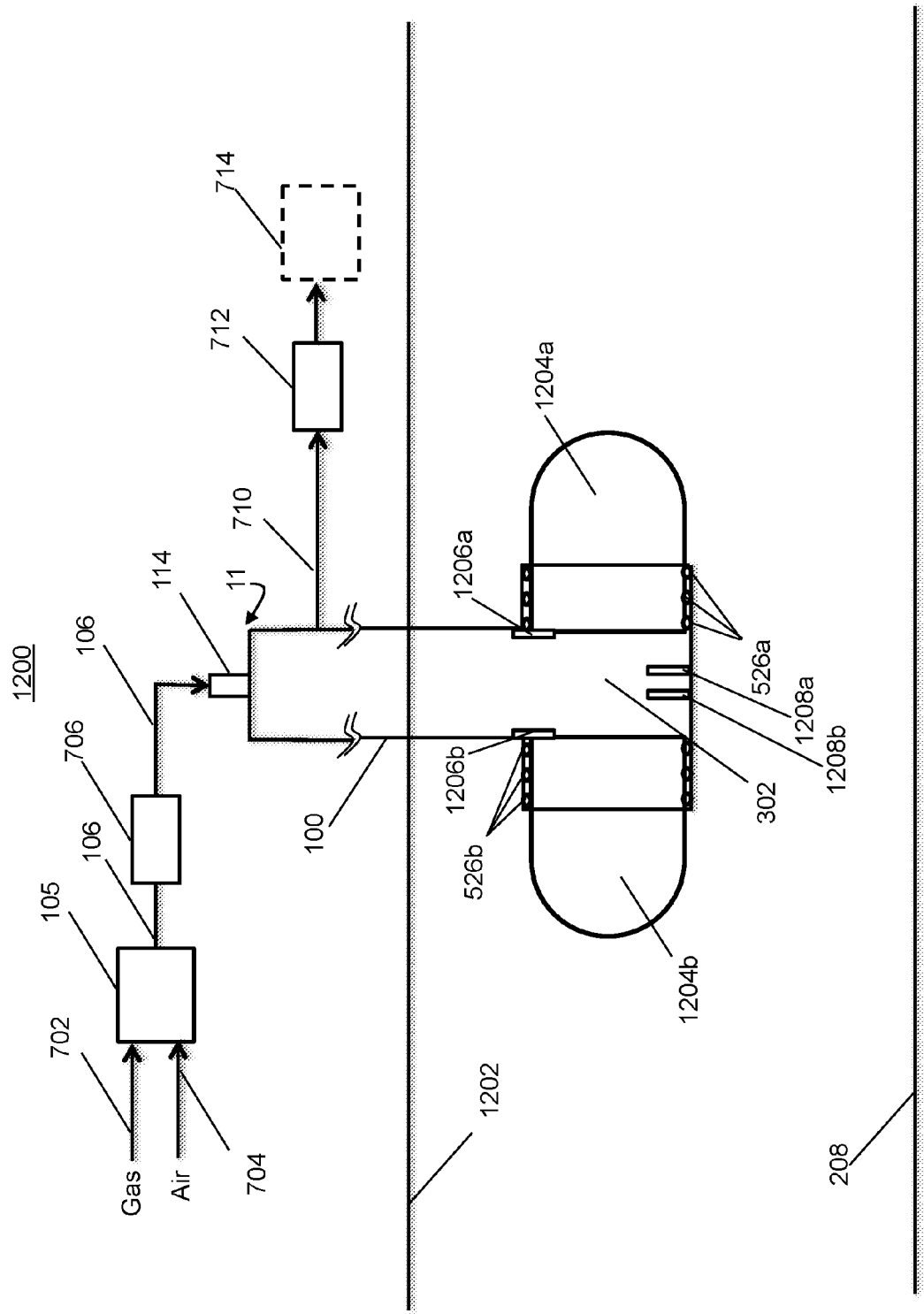

In accordance with still another aspect of the invention, an exemplary seismic exploration system 1200 depicted in FIGS. 12A and 12B is similar to the system 700 of FIG. 7A except the system 1200 is configured to be at least partially submerged in water 1202 (e.g., lake, ocean, gulf, etc.) such that upon detonation of the overpressure wave generator 11 two rounded pistons 1204*a* and 1204*b* move outward from first positions in the coupling chamber 302 as shown in FIG. 12A to second positions in the coupling chamber 302 as shown in FIG. 12B thereby producing. When the system 1200 is depressurized using the outflow valve assembly 712, the pressure of the water 1202 causes the pistons 1204*a* and 1204*b* to move back to their first positions. Also shown in FIGS. 12A and 12B are three o-rings 526*a* providing a seal between the walls of the coupling chamber 302 and the first rounded piston 1204*a* and three o-rings 526*b* providing a seal between the walls of the coupling chamber 302 and the second rounded piston 1204*b*, respectively. Forward motion stops 1206*a* and 1206*b* are attached to the rounded pistons 1204*a* and 1204*b* and backward motion stops 1208*a* and 1208*b* are configured inside the coupling chamber 302 that combine to limit the movement of the two rounded pistons 1204*a* and 1204*b*.

Under one arrangement of the system 1200 of FIGS. 12A and 12B, the pressure in the coupling chamber 302 can be controlled to substantially equalize with the pressure of the water 1202.

Under a second arrangement of the system 1200 of FIGS. 12A and 12B, the pressure of the water 1202 against the rounded pistons 1204*a* and 1204*b* can be used to pressurize the system 1200.

FIG. 13A depicts an exemplary calculation of an output pressure produced by a high pressure hot gas having a volume corresponding to the vessel in which the pressure is contained.

FIG. 13B depicts an exemplary piston inside a coupling chamber where the piston is attached to a mass. The piston moves a distance corresponding to its stroke and produces a force corresponding to the area of the piston surface and the pressure being used to produce the force.

FIG. 13C depict exemplary Pressure (or Force) vs. Time curves showing two decay rates from a peak pressure (or Force) produced at the detonation time $t_{det}$.

Figure 14B:
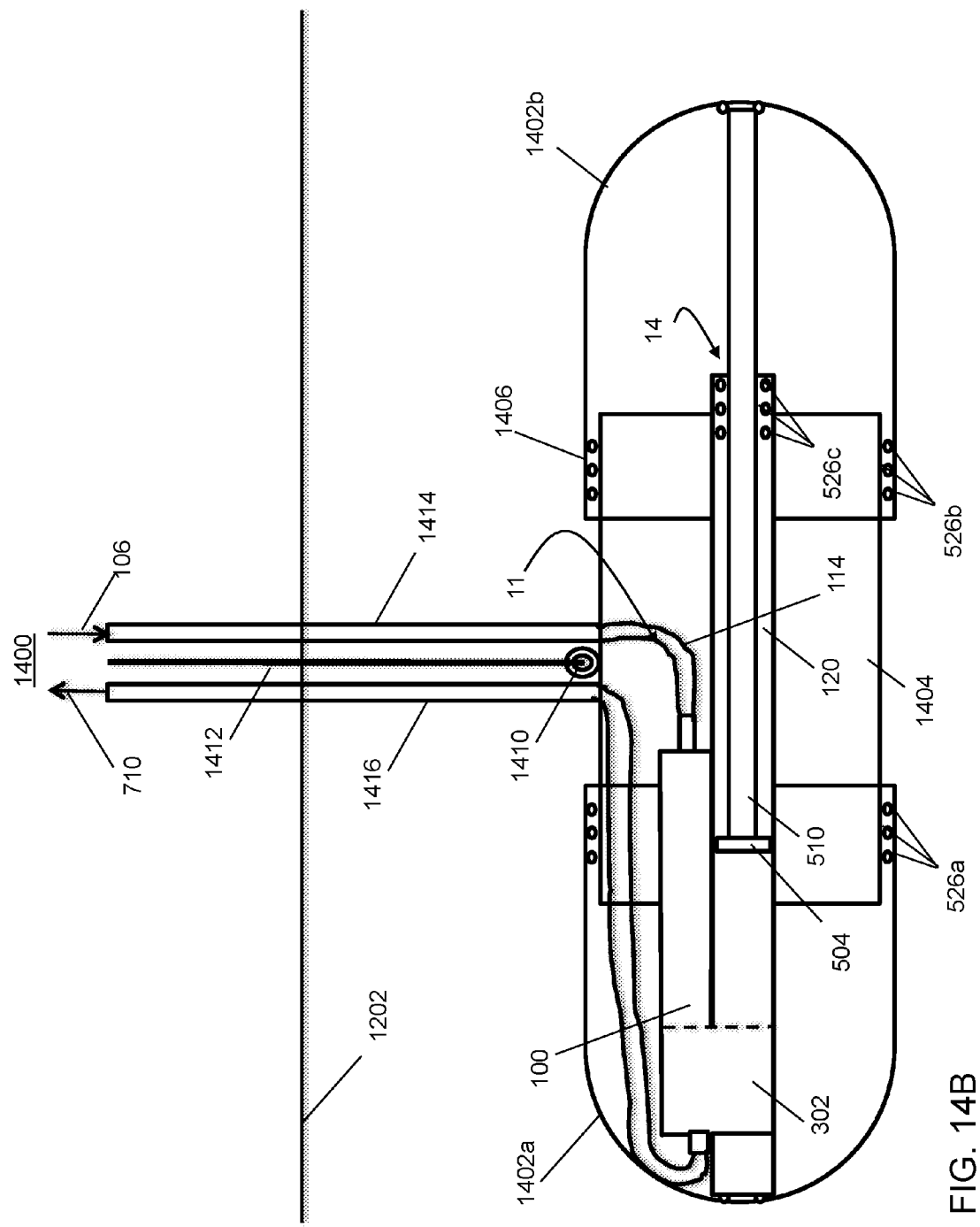

FIGS. 14A and 14B depict another exemplary seismic exploration system 1400 similar to the system 1200 of FIGS. 12A and 12B. Referring to FIGS. 14A and 14B, the system 1400 includes a first outer capsule portion 1402*a* and a second outer capsule portion 1402*b* and an inner capsule portion 1404. Between the inner capsule portion 1404 and the first and second outer capsule portions 1402*a* and 1402*b* are sets of o-rings 526*a* and 526*b*, respectively. Together, the first and second outer capsule portions 1402*a* and 1402*b*, the inner capsule portion 1404, and the two sets of o-rings 526*a* and 526*b* form a sealed capsule 1406 within which reside an overpressure wave generator 11 and an actuator subsystem 1408. An eyebolt 1410 is attached to the inner capsule portion 1404 and a cable 1412 is attached to the eyebolt 1410 allowing the sealed capsule 1406 to be lowered into the water 1202 using a winch or other similar system (not shown). Leading to and from the inner capsule portion 1404 are an input line 1414 for providing a fuel-oxidant mixture 106 and an output line 1416 for output of exhaust 710. The overpressure wave generator 11 includes a detonator 114 and detonation tube 100 that is connected to a coupling chamber 302. The coupling chamber is connected the cylinder 120 of the actuator subsystem 1408 such that pressure in the coupling chamber is applied to the top plate 504 that is connected to a piston rod 510. The overpressure wave generator is connected to the first outer capsule portion 1402*a* and the piston rod 510 is connected to the second outer capsule portion 1402*b* such that upon detonation of the overpressure wave generator 11 the pressure produced in the coupling chamber is applied to the top plate 504 thereby causing the piston rod 510 to move such that the first and second outer portions 1402*a* and 1402*b* move apart. When pressure is removed from the system 1400 by an outflow valve assembly 712 (not shown), the pressure of the water 1202 causes the first and second outer capsule portions 1402*a* and 1402*b* to move back to their prior positions.

In accordance with yet another aspect of the invention, one or more thermal insulators may be included in the coupling chamber to control the rate of temperature change of the gas inside the system after detonation of an overpressure wave(s), where the amount of thermal insulation provided by the thermal insulators can be selected to affect the timing of the depressurization of the system (i.e., the shape of the depressurization curve). One skilled in the art will recognize that by increasing the amount of thermal insulation of the system that the time that it takes for the temperature of the gas in the system to drop from a higher temperature to a lower temperature is increased and therefore the time required to depressurize the system is increased.

In accordance with still another aspect of the invention, one or more leveling devices can be employed with a system such as the system 910 of FIG. 9F in order to maintain a desired orientation of the system 910 relative to a target media 208. Examples of leveling devices include leveling feet, leveling mounts, leveler bolts, anti-vibration mounts, anti-vibration pads, hydraulic leveling jacks, and the like which may involve automated level measurements (e.g., laser level measurement) and a control system for automatically orienting a system. Moreover, one or more masses may be distributed based on a system's orientation relative to a target in order to effect (or steer) the direction of force produced by the system and the target media.

In accordance with a further aspect of the invention, one of various approaches can be employed to absorb the shock produced when a lifted mass returns to its position prior to detonation of an overpressure wave. One approach is to use the gas in system as a gas spring whereby rate at which the gas is allowed to depressurize is controlled so as to reduce the amount of shock that would otherwise be produced by the mass being allowed to drop freely to its pre-detonation position. A second approach is to use springs or other forms of shock absorbers on the rods 1102 (e.g., beneath the mass support elements 1104) used to support one or more masses 906 such as depicted in FIG. 11.

In accordance with one optional aspect of the invention, a vertical braking system can be employed whereby one or more metal plates 1404*a* and 1404*b* are associated with one or more masses 906, whereby one or more brake calipers 1404*a* and 1404*b* may engage the one or more metal plates when the one or more masses 906 has been lifted to a lifted position(s), for example, using a piston 1018. Referring to FIGS. 15A and 15B, the mass 906 of the system 1000 of FIG. 10 includes an optional vertical braking system comprising two metal plates 1402*a* and 1402*b* and two brake calipers 1404*a* and 1404*b*, where the system 1000 is shown with the mass 906 in its non-lifted and lifted positions, respectively.

In accordance with another optional aspect of the invention, a latching system can be employed, where one or more latching mechanisms 1406*a* and 1406*b* having pivotable latches 1408*a* and 1408*b* are used to maintain one or more masses in their lifted position(s). Referring to FIGS. 16A and 16B, the mass 906 of the system 1000 of FIG. 10 includes an optional latching system comprising two latching mechanisms 1406*a* and 1406*b*, where the system 1000 is shown with the mass 906 in its non-lifted and lifted positions, respectively. When in the lifted position, the pivotable latches engage slots (not shown) that are on the sides of the mass 906. A control system (not shown) can then cause the pivotable latches 1408*a* and 1408*b* to pivot so as to disengage from the slots and release the mass 906 allowing it to move to its non-lifted position.

In accordance with another further aspect of the invention, a shock produced by a mass 906 returning to its non-lifted position is used to produce a conducted acoustic wave. Under one arrangement, the mass is maintained in its lifted position for some period of time, for example, using a vertical breaking system or a latching system and then, after some amount of time, it is allowed to drop to its non-lifted position such that it produces a shock that produces a conducted acoustic wave in a target media.

In accordance with yet another further aspect of the invention, the coupling chamber 302 and piston rod 510 of a seismic system (e.g., the system 1000 of FIG. 10) are configured to pull a vacuum in the coupling chamber 302 during the lifting of a mass 906.

Figure 17B:
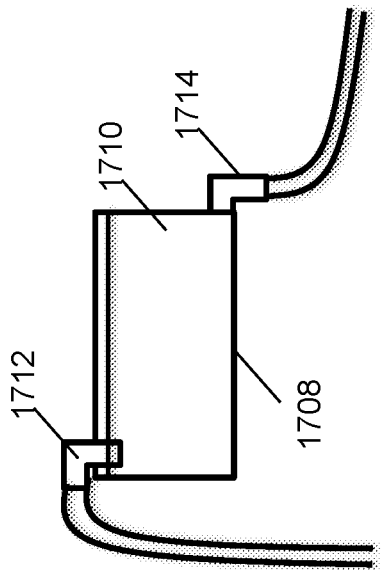
FIGS. 17A and 17B depict alternative approaches for providing a mass.
Figure 17A:
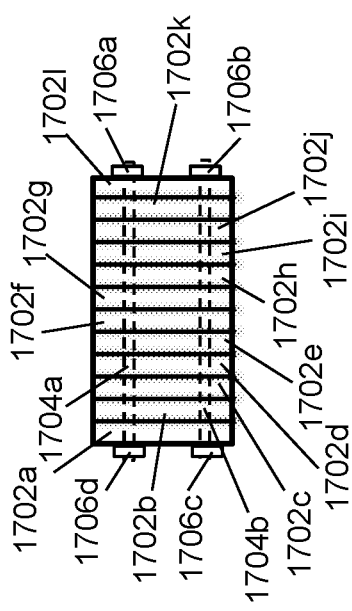

In accordance with still another further aspect of the invention depicted in FIG. 17A, a mass 906 may comprise a plurality of weights (e.g., iron plates) 1702*a*-1702*l*, which may be transported and assembled together into the mass 906 as part of the installation of a seismic system. The plurality of weights 1702*a*-1702*l* may be bolted together using threaded rods 1704*a* and 1704*b* and nuts 1706*a*-1706*d* or may be otherwise attached to each other during use of the system.

In accordance with an alternative aspect of the invention depicted in FIG. 17B, a mass 906 may comprise a vessel 1708 that can be filled with a fluid (e.g., water) 1710 via a supply line 1712 and emptied of the fluid 1710 using a drain 1714, where the system may be assembled and then the fluid pumped into the vessel. Multiple seismic systems may be employed where fluid 1710 can be pumped from one system to another system. For example, three systems may be employed where when a first system is being used for seismic exploration, a second system is being filled with the fluid being drained from a third system. Alternatively, two systems may be employed where a first system is filled and then used for exploration. The fluid from the first system can then be pumped from the first system to a second system that is otherwise installed during use of the first system. Once the fluid has been moved to the second system, the second system can then be used for seismic exploration while the first system is moved to a new location, and so on. Generally, various methods can be used to move the fluid from one system to another so as to make it available to provide mass for the system during its use but where the mass can then be moved to another system. As such, a system can be lighter when moved from one location to another due to the absence of the fluid during that time.

In accordance with an exemplary underground embodiment of the invention depicted in FIG. 18, a seismic system 1800 is contained within a casing 1802, for example, a cylinder-shaped casing, which may be installed in a target media 208 (e.g., dirt or sand). Inside the casing is a coupling chamber 302 connected to one or more detonation tubes 100*a* and 100*b* driven by one or more overpressure wave generators 11*a* and 11*b*. Upon detonation of one or more overpressure wave generators 11*a* and 11*b*, the piston rod 510 lifts a mass 906 and applies a force to an earth plate 318. The mass 906 may be configured such that its movement is constrained to only upwards and downwards movement by the walls of the casing 1802. For example, the mass 906 may have a cylinder shape that is complementary to a cylinder shape of the casing 1802.

While particular embodiments of the invention have been described, it will be understood, however, that the invention is not limited thereto, since modifications may be made by those skilled in the art, particularly in light of the foregoing teachings.

The invention claimed is:

1. A system for accelerating an external mass, comprising:
   a coupling component comprising a coupling chamber and a moveable component; and
   an overpressure wave generator configured to produce a detonation that produces a pressure within said coupling chamber, said pressure being applied to said moveable component to accelerate an external mass to produce a resultant force, said coupling chamber being substantially sealed when said detonation is produced, said external mass comprising at least one object other than said system having a weight added to said system prior to said detonation, said system bearing said weight of said external mass during said detonation, said external mass being removable from said system to remove said weight enabling said external mass and said system to be moved separately from a first location to a second location.

2. The system of claim 1, wherein said resultant force is directed vertically and perpendicular to a target media to conduct an acoustic wave into said target media.

3. The system of claim 1, wherein said resultant force is directed horizontally and parallel to a target media to conduct a plane shear wave into said target media.

4. The system of claim 1, wherein two systems are configured to direct corresponding two resulting forces horizontally and parallel to a target media to conduct a spherical shear wave into said target media.

5. The system of claim 4, wherein the two resulting forces are directed in opposite directions to each other and are separated by some distance.

6. The system of claim 1, wherein said moveable component is one of a piston or a plate.

7. The system of claim 1, wherein said external mass is configured to have an upward vertical movement when said detonation is produced.

8. The system of claim 1, wherein said external mass comprises a plurality of weights.

9. The system of claim 8, wherein said plurality of weights is a plurality of metal plates.

10. The system of claim 1, wherein said external mass is configured to have a downward vertical movement when said detonation is produced.

11. The system of claim 1, further comprising:
    a hydraulics transformer subsystem configured to lift said external mass.

12. The system of claim 1, further comprising:
    a leveling device.

13. The system of claim 1, wherein said system is configured to absorb a shock produced when a lifted external mass returns to its position prior to said detonation being produced.

14. The system of claim 1, further comprising:
a vessel configured to be filled with a fluid, said fluid being said external mass.

15. The system of claim 1, wherein a shock produced by said external mass returning to its non-lifted position is used to produce a conducted acoustic wave in a target media.

16. The system of claim 1, wherein said system is configured to pull a vacuum in the coupling chamber.

17. The system of claim 1, wherein said system is contained within a casing installed in a target media.

18. The system of claim 1, wherein said overpressure wave generator is a direct detonation overpressure wave generator.

19. A method for accelerating an external mass using a pressure produced by a detonation, comprising:
providing an external mass acceleration system comprising:
a coupling component comprising a coupling chamber and a moveable component; and
an overpressure wave generator configured to produce a detonation;
providing an external mass; and
producing using said overpressure wave generator said detonation to produce a pressure within said coupling chamber, said pressure being applied to said moveable component to accelerate said external mass to produce a resultant force, said coupling chamber being substantially sealed when said detonation is produced, said external mass comprising at least one object other than said system being provided to said system prior to said detonation, said system bearing the full weight of said external mass during said detonation, said external mass being removable from said system enabling said external mass and said system to be moved separately from a first location to a second location.

20. The method of claim 19, wherein said overpressure wave generator is a direct detonation overpressure wave generator.

* * * * *